US012276004B2

(12) United States Patent
Murakawa et al.

(10) Patent No.: US 12,276,004 B2
(45) Date of Patent: Apr. 15, 2025

(54) NON-ORIENTED ELECTRICAL STEEL SHEET

(71) Applicant: NIPPON STEEL CORPORATION, Tokyo (JP)

(72) Inventors: Tesshu Murakawa, Tokyo (JP); Hiroshi Fujimura, Tokyo (JP); Takeaki Wakisaka, Tokyo (JP); Takeshi Kubota, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 867 days.

(21) Appl. No.: 17/425,901

(22) PCT Filed: Feb. 14, 2020

(86) PCT No.: PCT/JP2020/005893

§ 371 (c)(1),
(2) Date: Jul. 26, 2021

(87) PCT Pub. No.: WO2020/166718

PCT Pub. Date: Aug. 20, 2020

(65) Prior Publication Data

US 2022/0186330 A1 Jun. 16, 2022

(30) Foreign Application Priority Data

Feb. 14, 2019 (JP) ................................ 2019-024587

(51) Int. Cl.
*C21D 8/12* (2006.01)
*C21D 9/46* (2006.01)
(Continued)

(52) U.S. Cl.
CPC .......... *C21D 8/1272* (2013.01); *C21D 8/1211* (2013.01); *C21D 8/1222* (2013.01);
(Continued)

(58) Field of Classification Search
CPC .. C21D 8/1272; C21D 8/1211; C21D 8/1222; C21D 8/1227; C21D 8/1233; C21D 9/46;
(Continued)

(56) References Cited

U.S. PATENT DOCUMENTS 5,084,112 A 1/1992 Tachino et al.
2006/0124207 A1 6/2006 Takashima et al.
(Continued)

FOREIGN PATENT DOCUMENTS

CN 107532260 A 1/2018
EP 3 176 279 A1 6/2017
(Continued)

OTHER PUBLICATIONS

"Recent Progress in Soft Magnetic Steels", The Iron and Steel Institute of Japan, Feb. 1, 1995, pp. 170-171.
(Continued)

*Primary Examiner* — Anthony M Liang
*Assistant Examiner* — Danny N Kang
(74) *Attorney, Agent, or Firm* — Birch, Stewart, Kolasch & Birch, LLP

(57) ABSTRACT

The present disclosure has as its object the provision of non-oriented electrical steel sheet excellent in magnetic properties which is free from any drop in magnetic flux density even after stress relief annealing and a method for manufacturing the same.
Non-oriented electrical steel sheet having a chemical composition containing C: 0.0030 mass % or less, Si: 2.0 mass % or more and 4.0 mass % or less, Al: 0.010 mass % or more and 3.0 mass % or less, Mn: 0.10 mass % or more and 2.4% mass or less, P: 0.0050 mass % or more and 0.20 mass % or less, S: 0.0030 mass % or less, and one or more elements selected from the group comprising Mg, Ca, Sr, Ba, Ce, La, Nd, Pr, Zn, and Cd: total 0.00050 mass % or more and
(Continued)

having a balance of Fe and unavoidable impurities, where, when designating a mass % of Si as [Si], a mass % of Al as [Al], and a mass % of Mn as [Mn], a parameter Q shown by the following formula (1) is 2.0 or more, a random intensity ratio of the {100} orientation is 2.4 or more, and an average grain size is 30 μm or less:

$$Q=[Si]+2[Al]-[Mn] \quad (1).$$

7 Claims, 1 Drawing Sheet

(51) Int. Cl.
*C22C 38/00* (2006.01)
*C22C 38/02* (2006.01)
*C22C 38/04* (2006.01)
*C22C 38/06* (2006.01)
*H01F 1/147* (2006.01)

(52) U.S. Cl.
CPC ......... *C21D 8/1227* (2013.01); *C21D 8/1233* (2013.01); *C21D 9/46* (2013.01); *C22C 38/002* (2013.01); *C22C 38/02* (2013.01); *C22C 38/04* (2013.01); *C22C 38/06* (2013.01); *H01F 1/14775* (2013.01)

(58) Field of Classification Search
CPC ...... C21D 1/02; C21D 2201/05; C21D 6/008; C21D 8/1205; C21D 8/1261; C21D 8/12; C22C 38/002; C22C 38/02; C22C 38/04; C22C 38/06; C22C 38/004; C22C 38/005; C22C 38/008; C22C 38/16; C22C 38/18; H01F 1/14775; H01F 1/147
See application file for complete search history.

(56) References Cited

U.S. PATENT DOCUMENTS

2018/0119258 A1 5/2018 Fujikura et al.
2020/0017942 A1 1/2020 Kubota et al.
2020/0040423 A1 2/2020 Natori et al.
2020/0152363 A1 5/2020 Kubota et al.
2020/0232059 A1 7/2020 Fujimura et al.

FOREIGN PATENT DOCUMENTS

| | | | | |
|---|---|---|---|---|
| JP | 60-238421 | A | | 11/1985 |
| JP | 62-112723 | A | | 5/1987 |
| JP | 2-8346 | A | | 1/1990 |
| JP | 2-22442 | A | | 1/1990 |
| JP | 8-134606 | A | | 5/1996 |
| JP | 11-172382 | A | | 6/1999 |
| JP | H11189850 | A | * | 7/1999 |
| JP | 11-335793 | A | | 12/1999 |
| JP | 2004-149823 | A | | 5/2004 |
| JP | 2005-113185 | A | | 4/2005 |
| JP | 2007-186790 | A | | 7/2007 |
| JP | 2010-90474 | A | | 4/2010 |
| JP | 2012140676 | A | * | 7/2012 |
| JP | 2016-3371 | A | | 1/2016 |
| JP | WO2018/164185 | A1 | | 9/2018 |
| JP | 2018-168412 | A | | 11/2018 |
| JP | 2018-168413 | A | | 11/2018 |
| WO | WO 2018/220837 | A1 | | 12/2018 |
| WO | WO 2018/220838 | A1 | | 12/2018 |
| WO | WO 2019/017426 | A1 | | 1/2019 |

OTHER PUBLICATIONS

Takashima et.al., "Texture Improvement in High-Permeability Nonoriented Electrical Steel by Antimony Addition", Journal of Materials Engineering and Performance, Apr. 1993, vol. 2, No. 2, pp. 249-254.
Park et al., "Effect of initial grain size on texture evolution and magnetic properties in nonoriented electrical steels," Journal of Magnetism and Magnetic Materials, vol. 321, 2009 (Available online Dec. 24, 2008), pp. 1928-1932.
English translation of "Recent Progress in Soft Magnetic Steels", The Iron and Steel Institute of Japan, Feb. 1, 1995, pp. 170-171.
Japanese Decision on Opposition dated Jun. 21, 2023 for corresponding Application No. 2023-700544 with an English translation.

* cited by examiner

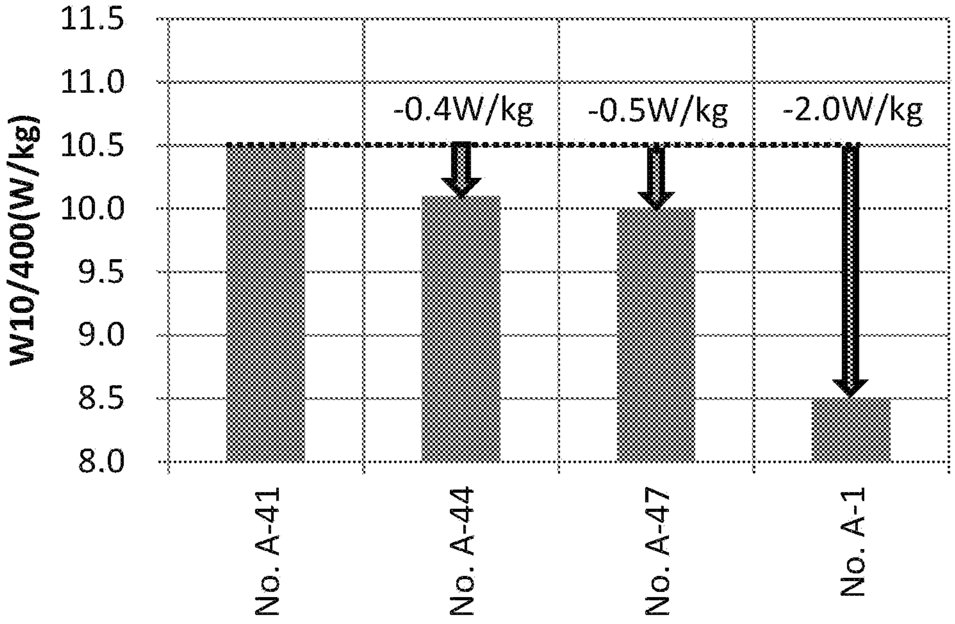
11.5
11.0
10.5
10.0
9.5
9.0
8.5
8.0
W10/400(W/kg)
-0.4W/kg
-0.5W/kg
-2.0W/kg
No. A-41
No. A-44
No. A-47
No. A-1

NON-ORIENTED ELECTRICAL STEEL SHEET

FIELD

The present disclosure relates to electrical steel sheet suitably used for applications such as magnetic cores of electric motors.

BACKGROUND

Non-oriented electrical steel sheet is used as a material for iron cores in motors, generators, and other rotating equipment or small sized transformers or other stationary equipment and plays an important role in determining the energy efficiency of electrical equipment.

As properties of electrical steel sheet, typically core loss and magnetic flux density are mentioned. The lower the core loss and the higher the magnetic flux density, the better. This is because when applying electric power to an iron core to induce a magnetic field, the lower the core loss, the more the energy lost due to heat can be reduced. Further, this is because the higher the magnetic flux density, the larger the magnetic field that can be induced by the same energy.

Therefore, to conserve energy and meet the increased demand for environmentally friendly products, non-oriented electrical steel sheet low in core loss and high in magnetic flux density and a method for manufacturing the same is being sought.

In such non-oriented electrical steel sheet, for example, if using blanks for use as stator cores for motors cut out from non-oriented electrical steel sheet, spaces are formed at the center parts of the blanks. If using the parts cut out for forming the spaces at the center parts as blanks for rotor use, that is, if fabricating a blank for rotor use and a blank for stator core use from a single non-oriented electrical steel sheet, the yield rises, so this is preferable.

In rotor applications where strength is required for handling high speed rotation, for example, non-oriented electrical steel sheet made higher in strength by making the crystal grain size finer and leaving behind working strain is demanded. On the other hand, high strength is not required for stator cores. Excellent magnetic properties obtained by making the crystal grain size coarser and relieving the working strain (high magnetic flux density and low core loss) are demanded. For this reason, if fabricating a blank for rotor use and a blank for stator core use from a single non-oriented electrical steel sheet, after the blank cut out for stator use is shaped into a stator core, additional heat treatment is performed to relieve the strain due to working the non-oriented electrical steel sheet made higher in strength and make the crystal grains coarser to raise the magnetic properties for use. This heat treatment is known as "stress relief annealing".

In stress relief annealing, there is clearly the effect of relieving the strain and enlarging the crystal grain size to improve the core loss, but simultaneously crystal orientations not preferable for the magnetic properties form and sometimes the magnetic flux density ends up falling, so if particularly high magnetic properties are sought, avoiding a drop in magnetic flux density by stress relief annealing is sought.

As opposed to this, in PTL 1, in non-oriented electrical steel sheet, it is made possible to keep down the increase in integration to (111) orientations after grain growth due to stress relief annealing by making the value of the ratio of the X-ray reflection surface intensities of the (100) and (111) orientations at a sheet parallel plane at a part of a depth of ⅕ of the thickness from the surface layer of the shaped part to the random crystal texture, that, the ratio of $I_{(1\ 0\ 0)}$ and $I_{(1\ 1\ 1)}$, within a predetermined range and securing a certain extent or more of degree of integration to the (100) orientation relative to the degree of integration to the (111) orientation near the surface layer of the steel sheet. As a result, it is made possible to provide non-oriented electrical steel sheet extremely excellent in magnetic properties with almost no drop in magnetic flux density after stress relief annealing.

On the other hand, in recent years, there has been an increase in motors operating at high speeds (below, referred to as "high speed motors"). In high speed motors, the centrifugal force acting on a rotary body such as a rotor becomes larger. Therefore, high strength is sought from the electrical steel sheet used as a material for rotors of high speed motors.

Further, in high speed motors, an eddy current forms due to the high frequency magnetic flux, the motor efficiency falls, and heat is generated. If the amount of heat generated becomes greater, the magnets inside the rotor are reduced in magnetism. For this reason, low core loss is sought in rotors of high speed rotation motors. Therefore, in electrical steel sheet used as a material for rotors, not only high strength, but also excellent magnetic properties are sought.

In PTLs 2 to 8, non-oriented electrical steel sheets aimed at achieving both such high strength and excellent magnetic properties are proposed.

In PTL 9, non-oriented electrical steel sheet able to give excellent magnetic properties in all directions in the sheet plane is proposed.

CITATIONS LIST

Patent Literature

[PTL 1] Japanese Unexamined Patent Publication No. 8-134606

[PTL 2] Japanese Unexamined Patent Publication No. 60-238421

[PTL 3] Japanese Unexamined Patent Publication No. 62-112723

[PTL 4] Japanese Unexamined Patent Publication No. 2-22442

[PTL 5] Japanese Unexamined Patent Publication No. 2-8346

[PTL 6] Japanese Unexamined Patent Publication No. 2005-113185

[PTL 7] Japanese Unexamined Patent Publication No. 2007-186790

[PTL 8] Japanese Unexamined Patent Publication No. 2010-090474

[PTL 9] WO2018/220837

SUMMARY

Technical Problem

In the above-mentioned PTL 1, it is true that the effect is exhibited of preventing a drop in the magnetic flux density after stress relief annealing, but there is no description relating to the strength sought from materials of rotating bodies such as rotors of motors engaged in high speed operation.

Further, in the non-oriented electrical steel sheet disclosed in the above-mentioned PTLs 1 to 8, no consideration is given to the properties after stress relief annealing and other additional heat treatment. The inventors studied this and as a result found that if additionally heat treating the non-oriented electrical steel sheets disclosed in these literature, sometimes the magnetic flux density can fall.

Further, in the non-oriented electrical steel sheet described in the above-mentioned PTL 9, the average grain size is relatively large, so sufficient tensile strength cannot be obtained.

In this way, in the prior art, in steel sheet having sufficient strength before stress relief annealing, there was the technical problem of keeping the magnetic flux density from falling due to stress relief annealing, making the core loss sufficiently lower, and obtaining sufficient tensile strength.

The present disclosure was made in consideration of the above-mentioned technical problem and has as its main object the provision of non-oriented electrical steel sheet used for example in drive motors etc. used for automobiles wherein it is made possible to fabricate a blank for rotor use having sufficient strength and a blank for stator core use having excellent magnetic properties (high magnetic flux density and low core loss) from a single non-oriented electrical steel sheet.

Solution to Problem

The inventors engaged in intensive studies and as a result discovered that electrical steel sheet with a random intensity ratio of the {100} orientations of the 1/2 center layer (below, sometimes referred to as the "{100} intensity") of a predetermined value or more and with ratios of composition of the Si, Al, and Mn in the electrical steel sheet in predetermined ranges can obtain the effect of reduction of the core loss due to stress relief annealing when performing such stress relief annealing and, by the total effect of the effect of improvement of the magnetic flux density due to making the {100} intensity higher and the effect of reduction of the core loss, the effect of improvement of the magnetic flux density while greatly reducing the core loss and thereby completed the present invention.

That is, the non-oriented electrical steel sheet according to the present disclosure has a chemical composition containing C: 0.0030 mass % or less, Si: 2.0 mass % or more and 4.0 mass % or less, Al: 0.010 mass % or more and mass 3.0% or less, Mn: 0.10 mass % or more and 2.4 mass % or less, P: 0.0050 mass % or more and 0.20 mass % or less, S: 0.0030 mass % or less, and one or more elements selected from the group comprising Mg, Ca, Sr, Ba, Ce, La, Nd, Pr, Zn, and Cd: total 0.00050 mass % or more and having a balance of Fe and unavoidable impurities, where when designating a mass % of Si as [Si], a mass % of Al as [Al], and a mass % of Mn as [Mn], a parameter Q shown by the following formula (1) is 2.0 or more, a {100} intensity is 2.4 or more, and an average grain size is 30 μm or less:

$$Q=[Si]+2[Al]-[Mn] \quad (1)$$

In the present disclosure, preferably at least one composition selected from the group of Sn: 0.02 mass % or more and 0.40 mass % or less, Cr: 0.02 mass % or more and 2.00 mass % or less, and Cu: 0.10 mass % or more and 2.00 mass % or less is included.

Furthermore, in the present disclosure, preferably diameter 100 nm or less metal Cu particles are contained in 5/10 $\mu m^3$ or more.

Furthermore, in the present disclosure, preferably the tensile strength is 600 MPa or more.

Advantageous Effects of Invention

According to the present disclosure, it is possible to provide electrical steel sheet having high strength and high magnetic flux density and having a high effect of reduction of core loss at the time of stress relief annealing.

BRIEF DESCRIPTION OF DRAWINGS

FIG. 1 is a graph showing the amount of drop of core loss in the examples.

DESCRIPTION OF EMBODIMENTS

Below, the non-oriented electrical steel sheet of the present disclosure and the method of manufacturing the same will be explained in detail.

Note that, "parallel", "vertical", "the same", and other terms and the values of the lengths and angles etc. specifying the shapes and geometric conditions and their extents used in this Description are not bound by their strict meanings and shall be interpreted as including ranges of extents where similar functions can be expected.

The non-oriented electrical steel sheet of the present disclosure has a chemical composition containing C: 0.0030 mass % or less, Si: 2.0 mass % or more and 4.0 mass % or less, Al: 0.010 mass % or more and 3.0 mass % or less, Mn: 0.10 mass % or more and 2.4 mass % or less, P: 0.0050 mass % or more and 0.20 mass % or less, S: 0.0030 mass % or less, one or more elements selected from the group comprised of Mg, Ca, Sr, Ba, Ce, La, Nd, Pr, Zn, and Cd: total of 0.00050 mass % or more and having a balance of Fe and unavoidable impurities, has a parameter Q shown by the following formula (1) of 2.0 or more when designating a mass % of Si as [Si], a mass % of Al as [Al], and a mass % of Mn as [Mn], has a {100} intensity of 2.4 or more, and has an average grain size of 30 μm or less:

$$Q=[Si]+2[Al]-[Mn] \quad (1)$$

The non-oriented electrical steel sheet of the present disclosure is extremely high in effect of reduction of the core loss at the time of stress relief annealing, so can give final finished products having high magnetic properties. This is believed to be due to the following reasons.

That is, in conventional non-oriented electrical steel sheet, if performing stress relief annealing or other additional heating, rather than crystal grains having {100} or {411} orientations considered good for magnetic properties, crystal grains having other orientations ({111} or {211}) considered not good for magnetic properties grow preferentially. It is believed that while the core loss drops due to the grain growth, the deterioration of crystal texture causes an increase in core loss, so the amount of drop in core loss becomes smaller. Further, the deterioration of crystal texture triggers a drop in magnetic flux density.

The non-oriented electrical steel sheet of the present disclosure has a parameter Q made 2 or more so as to make the steel sheet a single a-Fe phase and has a {100} intensity made 2.4 or more to thereby make the crystal orientations at the time of manufacture of the electrical steel sheet (that is, after finish annealing and before stress relief annealing) advantageous for lowering the core loss. In growth of the orientations at the time of gradual heating and grain growth after stress relief annealing or other additional heat treatment as well, it is guessed that other orientations do not grow preferentially and that high magnetic flux density is maintained while lower core loss is promoted.

In addition to this, by including one or more elements selected from the group comprised of Mg, Ca, Sr, Ba, Ce, La, Nd, Pr, Zn, and Cd, it is possible to scavenge the fine precipitates of MnS etc. (>1 μm) and thereby act preferably to promote selective growth of crystal grains having crystal orientations advantageous for magnetic properties or suppress selective growth of crystal grains having crystal orientations disadvantageous for magnetic properties. That is, in the non-oriented electrical steel sheet of the present disclosure having oxides or oxysulfides including the above predetermined group of elements, it is believed that the selectively of orientation is changed when deliberately lowering the annealing temperature at the initial stage of recrystallization (stage of 30 μm or less as crystal grain size) to keep down the crystal grain size and promoting growth of the crystals formed by a relatively high heating rate by a relatively low heating rate at the stage of grain growth in the latter period of recrystallization (stage of over 30 μm as crystal grain size).

Due to this, it is possible to keep the magnetic flux density from falling when performing stress relief annealing and simultaneously obtain a great effect of reduction of the core loss and believed possible to obtain high tensile strength.

Note that, regarding the present disclosure, combinations with other high strength art also stand. For example, it is also possible to jointly use the art of increasing the strength by using 100 nm or less Cu precipitates alone.

Below, the constitutions in the non-oriented electrical steel sheet of the present disclosure will be explained.

1. Chemical Composition

First, the chemical composition of the non-oriented electrical steel sheet of the present disclosure will be explained. Note that, the chemical composition explained below is the composition of the steel constituents forming the steel sheet. If the steel sheet used as the measurement sample has an insulating film etc. on its surface, it is the value after removing the same.

(1) C

The content of C is 0.0030 mass % or less.

If the content of C is large, it enlarges the austenite region and increases the phase transformation sections to suppress crystal grain growth of ferrite at the time of annealing, so is liable to cause an increase in the core loss. Further, if magnetic aging occurs, the magnetic properties in a high magnetic field also end up deteriorating, so the content of C is preferably made low.

From the viewpoint of the manufacturing costs, it is advantageous to use the degassing facility at the molten steel stage (for example, RH vacuum degassing facility) to decrease the content of C. If making the content of C 0.0030 mass % or less, the effect of suppressing magnetic aging is large. In the non-oriented electrical steel sheet according to the present disclosure, carbides and other nonmetallic precipitates are not used as the main means for increasing the strength, so there is no merit in going out of the way to include C. The content of C is preferably small. For this reason, the content of C is preferably 0.0015 mass % or less, more preferably 0.0012 mass % or less. If using electrodeposition or other techniques, it becomes possible to lower the content to 0.0001 mass % or less, which is below the limit of chemical analysis. The content of C may be 0 mass as well. On the other hand, if considering the industrial costs, the lower limit becomes 0.0003 mass %.

(2) Si

The content of Si is 2.0 mass % or more and 4.0 mass % or less.

Si is an important element added for obtaining the action of increasing the specific resistance to lower the eddy current loss. If the content of Si is small, the action of lowering the eddy current loss becomes hard to obtain, while if it is large, the steel sheet is liable to break at the time of cold rolling.

(3) Al

The content of Al is 0.010 mass % or more and 3.0 mass % or less.

Al is an element unavoidably added to deoxidize the steel in the steelmaking process and, like Si, is a main element added for obtaining the action of increasing the specific resistance to lower the eddy current loss. For this reason, Al is added in a large amount to lower the core loss, but if a large amount is added, the saturated magnetic flux density is reduced. In the present disclosure, it is needed so that the later explained parameter Q has to be made 2 or more and the structure made a single a-Fe phase.

(4) Mn

The content of Mn is 0.10 mass % or more and 2.4 mass % or less.

Mn may be proactively added for raising the strength of steel, but in the present disclosure, which makes positive use of Cu particulates as the main means for achieving high strength, it is not particularly required for that purpose. It is added for the purpose of raising the intrinsic resistance or making the sulfides coarser and promoting crystal grain growth so as to decrease the core loss, but excessive addition lowers the magnetic flux density.

(5) P

The content of P is 0.0050 mass % or more and 0.20 mass % or less.

P is an element with a remarkable effect of raising the tensile strength, but like Mn does not have to be deliberately added for this purpose in the present disclosure. P is added since it increases the specific resistance to lower the core loss and segregates at the crystal grain boundaries to thereby suppress formation of the {111} crystal texture disadvantageous to the magnetic properties and promote the formation of a {100} crystal texture advantageous to the magnetic properties. On the other hand, excessive addition causes the steel to become brittle and lowers the cold rollability and workability of the product.

(6) S

The content of S is 0.0030 mass % or less.

S sometimes bonds with the Mn in the steel whereby MnS is formed. MnS finely precipitates in the process of steel manufacture (>100 μm) and might suppress grain growth at the time of stress relief annealing. For this reason, the sulfides formed may cause deterioration of the magnetic properties, in particular the core loss, so the content of S is preferably as low as possible. Preferably, it is 0.0020 mass or less, more preferably 0.0010 mass or less.

(7) One or More Elements Selected from the Group Comprised of Mg, Ca, Sr, Ba, Ce, La, Nd, Pr, Zn, and Cd The total is 0.00050 mass % or more.

By including these elements in a total of 0.00050 mass % or more, high melting point precipitates with S are formed and formation of fine MnS in the steel is suppressed. Further, these raise the effect of selectivity of orientation at the time of stress relief annealing. On the other hand, even if excessively added, the effect of the invention becomes saturated. Not only that, precipitates are formed and hinder movement of the magnetic walls or obstruct grain growth to thereby cause the core loss to worsen, so the upper limit is made 0.10 mass %.

(8) Sn, Cr, and Cu

In the present disclosure, it is preferable to have at least one type of composition selected from the group comprising Sn: 0.02 mass % or more and 0.40 mass % or less, Cr: 0.02 mass % or more and 2.00 mass % or less, and Cu: 0.10 mass % or more and 2.00 mass % or less. Sn, Cr, and Cu cause the formation of crystals optimal for improving the magnetic properties by primary recrystallization. For this reason, if Sn, Cr, or Cu is included, a crystal texture formed with {100} crystals suitable for uniform improvement of the magnetic properties in all directions in the sheet plane is easily obtained by primary recrystallization. Further, Sn, Cr, and Cu suppress oxidation and nitridation of the surface of steel sheet at the time of finish annealing and suppress variations in size of the crystal grains. Therefore, Sn, Cr, or Cu may be included.

(9) Balance

The balance is Fe and unavoidable impurities. Among the unavoidable impurities, Nb, Zr, Mo, V, etc. are elements forming carbonitrides, so are preferably reduced as much as possible. The contents of these are preferably respectively 0.01 mass or less.

(10) Others

In the present disclosure, when designating the mass % of Si as [Si], the mass % of Al as [Al], and the mass % of Mn as [Mn], the parameter Q shown by the following formula (1) is 2.0 or more.

$$Q=[Si]+2[Al]-[Mn] \quad (1)$$

This is so as to make the non-oriented electrical steel sheet of the present disclosure a sole a-Fe phase and secures grain growth ability at the time of stress relief annealing.

2. Regarding {100} Intensity (Random Ratio Intensity of {100} Orientations at 1/2 Center Layer)

In the non-oriented electrical steel sheet of the present disclosure, the {100} intensity used is 2.4 or more. In this as well, 3.0 or more, in particular 3.5 or more, is preferable. Note that, no upper limit is particularly set, but it may be made 30 or less.

In the present disclosure, by making the {100} intensity within the above range, it is possible to obtain non-oriented electrical steel sheet excellent in magnetic properties which is free from a drop in magnetic flux density and greatly reduced in core loss when stress relief annealed or otherwise additionally heat treated.

The {100} intensity, that is, the X-ray random intensity ratio of the a-Fe phases of {100}, can be found from a reverse pole diagram obtained by measurement and calculation by X-ray diffraction.

Note that, the "random intensity ratio" is the value obtained by measuring the X-ray intensities of a standard sample not having integration to any specific orientation and a test sample under the same conditions and dividing the obtained X-ray intensity of the test sample by the X-ray intensity of the standard sample.

The measurement is performed at the position of a thickness ½ layer of the sample. At this time, the measurement surface is finished by chemical polishing etc. so as to become smooth.

3. Grain Size

In the non-oriented electrical steel sheet of the present disclosure, the crystal grain size is 30 μm or less, preferably 25 μm or less, more preferably 15 μm or less. Further, the lower limit value is preferably 3 μm or more, particularly preferably 15 μm or more. If the crystal grain size is larger than the above range, the improvement in the value of the core loss due to stress relief annealing is small and as a result the magnetic properties of the member after stress relief annealing end up deteriorating. On the other hand, if smaller than the above range, the value of the core loss of a member not treated by stress relief annealing ends up becoming larger. Further, if the crystal grain size is over 30 μm, the tensile strength falls and the desired tensile strength cannot be obtained. In the non-oriented electrical steel sheet of the present disclosure, by making the crystal grain size finer to 30 μm or less, the tensile strength is raised to 600 MPa or more and higher strength is achieved. The reason why the tensile strength rises if the crystal grains are fine is believed to be as follows: The tensile strength rises if dislocations in the steel material (defect in lattice) become harder to move. Further, it is known that if the dislocations reach the grain boundaries, they become harder to move. That is, if there are many grain boundaries, in other words, if the crystal grains are made finer, the tensile strength rises.

The above crystal grain size is the average grain size and can be obtained by the following method of measurement.

That is, a sample having a cross-section parallel to the rolling surface of the non-oriented electrical steel sheet is prepared by polishing etc. The polished surface of this sample (below, referred to as the "observed surface") is electrolytically polished to prepare the surface, then is analyzed for crystal structure utilizing the electron backscatter diffraction method (EBSD).

From EBSD analysis, in the observed surface, boundaries with crystal orientation differences of 15° or more are deemed crystal grain boundaries, individual regions surrounded by these crystal grain boundaries are deemed single crystal grains, and a region including 10000 or more crystal grain (observed region) is examined. In the observed region, the diameters of the crystal grains when measured by circle equivalent areas (circle equivalent diameters) are defined as the grain sizes. That is, a grain size means a circle equivalent diameter.

4. Metal Cu Particles

In the non-oriented electrical steel sheet of the present disclosure, diameter 100 nm or less metal Cu particles may also be included in amounts of 5 particles/10 $\mu m^2$ or more.

In the present disclosure, the presence of the metal Cu particles is believed to raise the strength of the non-oriented electrical steel sheet of the present disclosure and to contribute to improvement of the magnetic properties at the time of stress relief annealing as well.

In the present disclosure, as explained above, the diameter of the metal Cu particles is 100 nm or less. In particular, 1 nm to 20 nm in range, especially 3 nm to 10 nm in range, is preferable. Particles larger than the above range cause the efficiency of increasing strength to remarkably fall and make a large amount of Cu required, so the detrimental effect on the magnetic properties becomes greater. On the other hand, if the particles are smaller than the above range, the detrimental effect on the magnetic properties becomes greater, so this is not preferable. The diameter of the metal Cu particles can be determined by observation by an electron microscope. Note that, the "diameter" of the metal Cu particles also means the circle equivalent diameter.

Further, the number density of the metal Cu particles is 5/10 $\mu m^2$ or more. In particular, 100/10 $\mu m^2$ or more, especially 1000/10 $\mu m^2$ or more, is preferable. Being within the above range is effective on the point of increasing the strength.

The number density of metal Cu particles is found by using the same sample, measuring oxides in a 10 μm×10 μm field, and taking the average of the measured values of at least five fields or more.

To form metal Cu particles in the steel sheet in the present disclosure, it is important to go through the following such heat history. That is, in the process of manufacturing a finished sheet, the sheet is held in the 450° C. to 720° C. temperature region for 30 seconds or more. Furthermore, in the later processes, it is preferable to not hold the sheet in the temperature region over 800° C. for 20 seconds or more.

By going through such a process, metal Cu particles with characteristic diameters and number density are efficiently formed and higher strength can be sought without detracting from the magnetic properties almost at all.

After this heat treatment process, the steel material becomes higher in strength, so this heat treatment process is performed after the rolling process. Performing it simultaneously with recrystallization annealing and other heat treatment considered necessary for other purposes is advantageous from the viewpoint of productivity. That is, if cold rolled electrical steel sheet, it is preferable to hold it at a 450° C. to 720° C. temperature region for 30 seconds or more in the final heat treatment process after cold rolling while if hot rolled electrical steel sheet, it is preferable to hold it there for that long in the process of cooling from the 750° C. or more temperature region in the final heat treatment process after hot rolling.

Further, depending on the properties etc. aimed at, further heat treatment is sometimes applied, but in this case, it is preferable not to hold the steel sheet at a temperature region over 800° C. for 20 seconds or more. This is because if performing heat treatment at temperatures or for times exceeding this, the Cu metal phases formed sometimes redissolve or conversely aggregate to form coarse metal phases.

The present disclosure does not utilize strengthening by refining the crystal structure, so there is the effect that even if performing SRA (stress relief annealing) to restore strain introduced in the material when stamping steel sheet and working it into a motor part and to grow the crystal grains to restore and improve the magnetism, the deterioration in strength is small.

5. Others

The non-oriented electrical steel sheet of the present disclosure may further have an insulating film on the surface of the steel sheet.

The insulating film in the present disclosure is not particularly limited. It can be suitably selected and used in accordance with the application etc. from among known ones. It may be either an organic-based film or an inorganic-based film. As the organic-based film, for example, a polyamine-based resin, acrylic resin, acrylstyrene resin, alkyd resin, polyester resin, silicone resin, fluororesin, polyolefin resin, styrene resin, vinyl acetate resin, epoxy resin, phenol resin, urethane resin, melamine resin, etc. may be mentioned. Further, as the inorganic-based film, for example, a phosphate-based film or aluminum phosphate-based film or further an organic-inorganic composite film including the above resin etc. may be mentioned.

The thickness of the insulating film is not particularly limited, but a thickness per side of 0.05 μm or more and 2 μm or less is preferable.

The method of forming the insulating film is not particularly limited, but for example the above resin or inorganic substance may be dissolved in a solvent to prepare a composition for forming the insulating film and that composition for forming the insulating film may be uniformly coated on the surface of the steel sheet by a known method to form the insulating film.

The thickness of the electrical steel sheet of the present disclosure is not particularly limited so long as being suitably adjusted in accordance with the application etc., but from the viewpoint of manufacture, it is usually 0.10 mm or more and 0.60 mm or less, more preferably 0.015 mm or more and 0.50 mm or less. From the viewpoint of the balance of the magnetic properties and productivity, 0.015 mm or more and 0.35 mm or less is preferable.

The electrical steel sheet of the present disclosure is particularly suited for applications where it is used stamped into a desired shape. For example, it can be suitably used for servo motors used for electrical equipment, stepping motors, compressors of electrical equipment, motors used for industrial applications, drive motors for electric vehicles, hybrid vehicles, and trains, generators and cores used for various applications, choke coils, reactors, current sensors, and other conventionally known applications where electrical steel sheets are used.

Among these, in the present disclosure, it can be suitably used for the later explained motor cores for rotor use and motor cores for stator use.

6. Method for Manufacturing Non-Oriented Electrical Steel Sheet

The method for manufacturing the above-mentioned non-oriented electrical steel sheet of the present disclosure is not particularly limited, but the following (1) high temperature hot rolling sheet annealing+cold rolling strong reduction method, (2) thin slab continuous casting method, (3) lubricating hot rolling method, (4) strip casting method, etc. may be mentioned.

Note that, whatever the method, the chemical composition of the slab or other starting material is the chemical composition described in the above section "A. Non-oriented electrical steel sheet, 1. Chemical composition".

(1) High Temperature Hot Rolling Sheet Annealing+Cold Rolling Strong Reduction Method First, a slab is manufactured by a steelmaking process. The slab is heated by a reheating furnace, then rough rolled and finish rolled consecutively in a hot rolling process to obtain a hot rolled coil. The hot rolling conditions are not particularly limited. It may be a general method of manufacture, that is, a method of manufacture completing the finish hot rolling of a slab heated to 1000 to 1200° C. at 700 to 900° C. and coiling it at 500 to 700° C.

Next, the hot rolled coil of steel sheet is hot rolling sheet annealed. Due to the hot rolling sheet annealing, the steel sheet is made to recrystallize and the crystal grains are made to grow coarsely to a crystal grain size of 300 to 500 μm.

The hot rolling sheet annealing may be continuous annealing or may be batch annealing. From the viewpoint of costs, hot rolling sheet annealing is preferably performed by continuous annealing. For continuous annealing, the crystal grains have to be made to grow at a high temperature in a short time. By making the contents of Si etc. satisfy the parameter $Q \geq 2.0$, it is possible to render them constituents which do not cause ferrite-austenite transformation at a high temperature. In the case of continuous annealing, the hot rolling sheet annealing temperature can for example be made 1050° C.

Next, the steel sheet is pickled before cold rolling.

Pickling is a process required for removing scale from the surface of the steel sheet. The pickling conditions are selected in accordance with the state of removal of scale. Note that, instead of pickling, a grinder may be used to remove the scale.

Next, the steel sheet is cold rolled.

Here, in high grade non-oriented electrical steel sheet with a high content of Si, if the crystal grain size is made too coarse, the steel sheet will become brittle and brittle fracture might occur in cold rolling. For this reason, usually the average grain size of the steel sheet before cold rolling is limited to ordinarily 200 μm or less. On the other hand, in the present disclosure, the average grain size before cold rolling is made 300 to 500 μm and the following cold rolling is performed by a rolling reduction of 88 to 97%.

Note that, instead of cold rolling, from the viewpoint of avoiding brittle fracture, warm rolling may be performed at a temperature of the ductile/brittle transition temperature of the material or more.

After that, if performing finish annealing, ND//<100> recrystallized grains grow. Due to this, the {100} face intensity increases and the probability of presence of {100} oriented grains rises.

Next, the steel sheet is finish annealed.

The finish annealing has to be performed under conditions for obtaining a crystal grain size by which desired magnetic properties are obtained, but the conditions may be the range of finish annealing conditions of ordinary non-oriented electrical steel sheet. However, to obtain fine crystal grains, a low temperature is desirable. 800° C. or less is desirable.

The finish annealing may be continuous annealing or may be batch annealing. From the viewpoint of costs, the finish annealing is preferably performed by continuous annealing.

The above-mentioned non-oriented electrical steel sheet of the present disclosure is obtained through the above processes.

(2) Thin Slab Continuous Casting Method

In the thin slab continuous casting method, a 30 to 60 mm thick slab is manufactured in the steelmaking process. The rough rolling of the hot rolling process is omitted. It is preferable to make columnar crystals sufficiently grow in the thin slab and leave the {100}<011> orientations obtained by working the columnar crystals in the hot rolling in the hot rolled sheet. In the process, the columnar crystals grow so that the {100} faces become parallel to the surface of the steel sheet. For this purpose, it is desirable to not perform electromagnetic stirring in continuous casting. Further, it is desirable to greatly reduce the micro inclusions in the molten steel which promote formation of solidification nuclei.

Further, after heating the thin slab in a reheating furnace, it is continuously finish rolled in the hot rolling process to obtain an approximately 2 mm thick hot rolled coil.

After that, the steel sheet of the hot rolled coil is hot rolling sheet annealed, pickled, cold rolled, and finish annealed in the same way as the above "(1) high temperature hot rolling sheet annealing+cold rolling strong reduction method".

The above-mentioned non-oriented electrical steel sheet of the present disclosure is obtained through the above processes.

(3) Lubricating Hot Rolling Method

First, a slab is manufactured by a steelmaking process. The slab is heated by a reheating furnace, then rough rolled and finish rolled consecutively in a hot rolling process to obtain a hot rolled coil.

Here, while usually performed without lubrication, the hot rolling is hot rolling performed under suitable lubrication conditions. If performing hot rolling under suitable lubrication conditions, the shear deformation introduced in the vicinity of the surface layer of the steel sheet is reduced. Due to this, usually worked structures having an RD//<011> orientation called a-fibers grown at the center of the steel sheet can be made to reach up to near the surface layer of the steel sheet. For example, as described in Japanese Unexamined Patent Publication No. 10-36912, at the time of hot rolling, by mixing in 0.5 to 20% of grease as the lubricant into the hot rolling roll cooling water and making the average frictional coefficient between the finish hot rolling rolls and the steel sheet 0.25 or less, it is possible to grow the a-fibers. The temperature conditions at this time are not particularly designated. The temperature may be similar to the above "(1) high temperature hot rolling sheet annealing+cold rolling strong reduction method".

After that, the steel sheet of the hot rolled coil is hot rolling sheet annealed, pickled, cold rolled, and finish annealed in the same way as the above "(1) high temperature hot rolling sheet annealing+cold rolling strong reduction method". If making the a-fibers grow to near the surface layer of the steel sheet in the steel sheet of the hot rolled coil, in the later hot rolling sheet annealing, {h11}<1/h12>, in particular, {100}<012> to {411}<148>, recrystallize. If pickling, then cold rolling and finish annealing the steel sheet, {100}<012> to {411}<148> recrystallize. Due to this, the {100} face intensity increases and the probability of presence of {100} oriented grains rises.

The above-mentioned non-oriented electrical steel sheet of the present disclosure is obtained through the above processes.

(4) Strip Casting Method

First, in the steelmaking process, strip casting is used to directly manufacture a 1 to 3 mm thick hot rolled coil.

In the strip casting, by rapidly cooling the molten steel between a pair of water-cooled rolls, it is possible to directly obtain steel sheet of a thickness corresponding to the hot rolled coil. At that time, by sufficiently raising the temperature difference between the surfacemost surface of the steel sheet contacting the water-cooled rolls and the molten steel, the crystal grains solidifying at the surface grow in the direction vertical to the steel sheet and form columnar crystals.

In steel having a BCC structure, the columnar crystals grow so that their {100} faces become parallel to the surface of the steel sheet. The {100} face intensity increases and the probability of presence of {100} oriented grains rises. Further, it is important to not allow change from the {100} faces as much as possible in the transformation, working, or recrystallization. Specifically, it is important to include the ferrite promoting element of Si and limit the content of the austenite promoting element of Mn to make the structure a single ferrite phase from right after solidification to room temperature without going through formation of an austenite phase at a high temperature.

Even if austenite-ferrite transformation occurs, some {100} faces are maintained, but by making the contents of Si etc. satisfy the parameter Q≥2.0, it is possible to make the constituents ones not causing ferrite-austenite transformation at a high temperature.

Next, the steel sheet of the hot rolled coil obtained by strip casting is hot rolled then the obtained hot rolled sheet is annealed (hot rolling sheet annealing).

Note that, hot rolling need not be performed. It is also possible to perform post-treatment as is.

Further, it is also possible to perform the post treatment as is without performing hot rolling sheet annealing. Here, if introducing 30% or more strain to the steel sheet by hot rolling, if performing the hot rolling sheet annealing at a 550° C. or more temperature, recrystallization occurs from the parts where strain is introduced and the crystal orientations sometimes change. Therefore, if introducing 30% or more strain by hot rolling, hot rolling sheet annealing is not performed or is performed at a temperature with no recrystallization.

Next, the steel sheet is cold rolled after pickling.

Cold rolling is a process essential for obtaining the desired product thickness. However, if the rolling reduction of the cold rolling becomes excessive, the desired crystal orientation can no longer be obtained in the finished product. For this reason, the rolling reduction of cold rolling is preferably made 90% or less, more preferably 85% or less, still more preferably 80% or less. The lower limit of the rolling reduction of the cold rolling does not particularly have to be set, but the lower limit of rolling reduction is determined from the thickness of the steel sheet before cold rolling and the desired thickness of the finished product. Further, even when the surface properties and flatness sought from laminated steel sheets are not obtained, cold rolling becomes necessary, so the smallest cold rolling for the purpose becomes necessary.

The cold rolling may be performed by a reverse mill or may be performed by a tandem mill.

Note that, instead of cold rolling, from the viewpoint of avoiding brittle fracture, warm rolling may be performed at a temperature of the ductile/brittle transition temperature of the material or more.

Note that, the pickling and finish annealing are performed in the same way as the above "(1) high temperature hot rolling sheet annealing+cold rolling strong reduction method".

The above-mentioned non-oriented electrical steel sheet of the present disclosure is obtained through the above processes.

The present disclosure is not limited to the above-mentioned embodiment. The above-mentioned embodiment is an illustration. Any mode having substantially the same constitution of the technical idea described in the claims of the present disclosure and exhibiting similar actions and effects is included in the technical scope of the present disclosure.

EXAMPLES

Below, examples will be illustrated to specifically explain the present disclosure. Note that the conditions in the examples are illustrations employed for confirming the workability and effects of the present disclosure. The present disclosure is not limited to the conditions of the examples. The present disclosure can employ various conditions so long as not departing from the gist and achieving the object.

Example 1

250 mm thick slabs having the chemical compositions shown in the following Table 1 were prepared.

Next, the slabs were hot rolled to prepare 5.0 mm thick and 2.0 mm thick hot rolled sheets. The slab reheating temperature at that time was 1200° C., the finishing temperature was 850° C., and the coiling temperature was 650° C. The hot rolled sheets were annealed at 1050° C. for 30 minutes, then were pickled to remove the surface layer scale. After that, they were cold rolled to 0.25 mm. The finish annealing operations were performed at 750° C. and 1050° C. respectively for 1 minute. A-38 to 40 were annealed at 600° C. for 1 minute after finish annealing as treatment for precipitation of Cu.

The obtained non-oriented electrical steel sheets were measured for {100} crystal texture, average grain size, tensile strength, number of Cu precipitates, core loss W10/400, and magnetic flux density B50. The {100} crystal texture was found by calculation of the reverse pole diagram from X-ray diffraction. The core loss W10/400 is the energy loss (W/kg) occurring in iron when applying a 1.0 alternating magnetic field at 400 Hz. The magnetic flux density B50 is the magnetic flux density occurring in iron when applying a 5000 A/m magnetic field at 50 Hz. The measurement value was made the average of the rolling direction and the 90° direction when cutting out 55 mm square pieces of the steel sheets (one side in rolling direction) from the base materials.

After the above measurement, stress relief annealing was performed. The stress relief annealing was performed by raising the temperature by 100° C./hr, soaking for 2 hours after reaching 800° C., then gradually cooling by 100° C./hr. However, the stress relief annealing of the materials treated for precipitation of Cu was performed by raising the temperature by 100° C./hr, soaking for 2 hours after reaching 950° C., then gradually cooling by 100° C./hr. After stress relief annealing, the same procedure was followed as above to measure the core loss and magnetic flux density.

To investigate the strength of the materials before stress relief annealing, test pieces were taken in a direction parallel to the rolling direction and were subjected to tensile tests. For the test pieces at that time, JIS No. 5 test pieces were used. The maximum stresses (tensile strengths) until breakage were measured. The measurement results are shown in Table 2.

The materials made from the 5.0 mm thick hot rolled sheets had {100} intensities after finish annealing of larger than 2.4 (A1 to 40, A44 to 46, A50, and A57 to 58). The materials made from 2.0 mm thick hot rolled sheets had {100} intensities after finish annealing of lower than 2.4 (A41 to 43 and A47 to 49). A-51 to 56 were hot rolled sheets of 5.0 mm thickness, but Q was less than 2.0, so after finish annealing, the {100} intensities became lower than 2.4. The crystal grain sizes became about 20 μm or so in materials finished annealed at 750° C. (A1 to 40 and A47 to 57) and about 100 μm in materials finish annealed at 1050° C. (A-41 to 46).

A-1 to 30 were changed in various additive elements. Whatever the additive elements added, the effect of greatly lowering the core loss after stress relief annealing was obtained. A-31 to 40 had optional additive elements added to them. Even if adding optional additive elements, the effect of the core loss greatly falling at the time of stress relief annealing remained unchanged. A-37 to 40 had Cu added as an optional additive element. Among these, A-38 to 40 are invention examples treated to cause precipitation of metal particles. The average size and number of precipitates of metal Cu particles in A-38 to 40 were respectively about 30 nm and about 100/10 $\mu m^2$. Due to this precipitation treatment, if comparing A-38 to 40 and the Invention Examples A-1 to 3 of similar constituents, it is learned that between A-1 and A-38, A-2 and A-39, and A-3 and A-40, the ones treated to cause precipitation were higher in tensile strength. Therefore, by adding Cu as an optional additive element and performing treatment for precipitation of metal particles, the effect is obtained that it is possible to make the tensile strength particularly high.

A-1 and 41 to 49 are almost the same in constituents and are changed in manufacturing conditions. A graph showing together the results of measurement of core loss after SRA of A-1, 41, 44, and 47 among these is shown in FIG. 1. By increasing the {100} intensity or making the crystal grains before stress relief annealing smaller to make them coarser after stress relief annealing, there is the effect of lowering the core loss, but it is learned that when combining the two, it is possible to reduce the core loss after stress relief annealing more due to the synergistic effect. Note that, regarding the core loss after stress relief annealing, a core loss when Si is 2.0 to 2.3% of 9.5 W/kg or less, a core loss when Si is 2.4 to 3.1% of 9.0 W/kg or less, and a core loss when Si is 3.8 to 4.0% of 8.5 W/kg or less are deemed passing levels. Core losses higher than these are reached even without using the present invention, so are deemed failing.

The reason why the core loss falls if the {100} intensity increases is believed to be that the directions of easy magnetization of bcc iron become aligned in the plane, the magnetic flux leaking to outside the system becomes smaller, and the loss due to magnetic domain wall movement becomes smaller. Further, even if the average grain size after the stress relief annealing is made the same approximately 100 μm, rather than making the grain size this by the finish annealing, the core loss became lower if making the grain size finer after the finish annealing to make it 100 μm after the stress relief annealing. The reason is believed to be that the micro strain introduced at the time of cooling at the time of finish annealing is swept away by movement of the crystal grain boundaries. The reason for this synergistic effect is guessed to be that the stress relief annealing causes the {100} oriented grains to eat away other oriented grains not good for the magnetic properties.

A-50 shows the properties when Mg and other elements for scavenging MnS are not included. Even if performing stress relief annealing, the crystal grain size failed to satisfactorily grow and as a result the core loss became worse.

A-41, 42, and 43 show comparative examples with {100} intensities of less than 2.4, but grain sizes of over 30 μm. Further, A-44, 45, 46, and 58 show comparative examples with {100} intensities of 2.4 or more, but grain sizes of over 30 μm. From these comparative examples, it will be learned that if the grain size becomes over 30 μm, sufficient tensile strength cannot be obtained.

A-51 to 56 show comparative examples with Q of less than 2.0. In these comparative examples, the steel sheets do not become solely a-Fe phases, so at the time of hot rolling sheet annealing, the crystal grain sizes could not be made coarser and the {100} intensities after finish annealing became lower than 2.4.

TABLE 1

| No. | Constituents (mass %) | | | | | | | | | | | | | | | | | | | Q | Remarks |
|---|---|---|---|---|---|---|---|---|---|---|---|---|---|---|---|---|---|---|---|---|---|
| | C | Si | Mn | Al | P | S | Mg | Ca | Sr | Ba | Ce | La | Nd | Pr | Zn | Cd | Sn | Cr | Cu | | |
| A-1 | 0.0018 | 2.95 | 0.19 | 0.28 | 0.010 | 0.0014 | 0.0048 | — | — | — | — | — | — | — | — | — | — | — | — | 3.3 | Inv. ex. |
| A-2 | 0.0006 | 2.10 | 0.11 | 0.11 | 0.006 | 0.0009 | 0.0006 | — | — | — | — | — | — | — | — | — | — | — | — | 2.2 | Inv. ex. |
| A-3 | 0.0026 | 3.90 | 2.20 | 2.90 | 0.195 | 0.0025 | 0.0070 | — | — | — | — | — | — | — | — | — | — | — | — | 7.5 | Inv. ex. |
| A-4 | 0.0017 | 2.96 | 0.18 | 0.29 | 0.012 | 0.0014 | — | 0.0042 | — | — | — | — | — | — | — | — | — | — | — | 3.4 | Inv. ex. |
| A-5 | 0.0007 | 2.00 | 0.11 | 0.13 | 0.005 | 0.005 | — | 0.0005 | — | — | — | — | — | — | — | — | — | — | — | 2.2 | Inv. ex. |
| A-6 | 0.0028 | 3.95 | 2.35 | 2.95 | 0.195 | 0.0027 | — | 0.0050 | — | — | — | — | — | — | — | — | — | — | — | 7.5 | Inv. ex. |
| A-7 | 0.0015 | 2.97 | 0.19 | 0.28 | 0.013 | 0.0012 | — | — | 0.0043 | — | — | — | — | — | — | — | — | — | — | 3.3 | Inv. ex. |
| A-8 | 0.0008 | 2.10 | 0.13 | 0.12 | 0.007 | 0.0008 | — | — | 0.0006 | — | — | — | — | — | — | — | — | — | — | 2.2 | Inv. ex. |
| A-9 | 0.0028 | 3.97 | 2.20 | 2.89 | 0.192 | 0.0025 | — | — | 0.0060 | — | — | — | — | — | — | — | — | — | — | 7.6 | Inv. ex. |
| A-10 | 0.0020 | 2.98 | 0.19 | 0.32 | 0.012 | 0.0014 | — | — | — | 0.0043 | — | — | — | — | — | — | — | — | — | 3.4 | Inv. ex. |
| A-11 | 0.0007 | 2.20 | 0.12 | 0.10 | 0.007 | 0.0007 | — | — | — | 0.0006 | — | — | — | — | — | — | — | — | — | 2.3 | Inv. ex. |
| A-12 | 0.0027 | 3.99 | 2.30 | 2.99 | 0.192 | 0.0026 | — | — | — | 0.0060 | — | — | — | — | — | — | — | — | — | 7.7 | Inv. ex. |
| A-13 | 0.0018 | 2.96 | 0.19 | 0.31 | 0.012 | 0.0013 | — | — | — | — | 0.0048 | — | — | — | — | — | — | — | — | 3.4 | Inv. ex. |
| A-14 | 0.0007 | 2.15 | 0.13 | 0.15 | 0.008 | 0.0007 | — | — | — | — | 0.0006 | — | — | — | — | — | — | — | — | 2.3 | Inv. ex. |
| A-15 | 0.0027 | 3.96 | 2.29 | 2.85 | 0.191 | 0.0026 | — | — | — | — | 0.0050 | — | — | — | — | — | — | — | — | 7.4 | Inv. ex. |
| A-16 | 0.0015 | 3.00 | 0.19 | 0.30 | 0.011 | 0.0014 | — | — | — | — | — | 0.0040 | — | — | — | — | — | — | — | 3.4 | Inv. ex. |
| A-17 | 0.0007 | 2.22 | 0.15 | 0.12 | 0.009 | 0.0007 | — | — | — | — | — | 0.0006 | — | — | — | — | — | — | — | 2.3 | Inv. ex. |
| A-18 | 0.0028 | 3.87 | 2.33 | 2.98 | 0.193 | 0.0026 | — | — | — | — | — | 0.0065 | — | — | — | — | — | — | — | 7.5 | Inv. ex. |
| A-19 | 0.0018 | 2.95 | 0.19 | 0.31 | 0.011 | 0.0012 | — | — | — | — | — | — | 0.0041 | — | — | — | — | — | — | 3.4 | Inv. ex. |
| A-20 | 0.0008 | 2.13 | 0.11 | 0.13 | 0.012 | 0.0008 | — | — | — | — | — | — | 0.0006 | — | — | — | — | — | — | 2.3 | Inv. ex. |
| A-21 | 0.0028 | 3.97 | 2.31 | 2.99 | 0.189 | 0.0027 | — | — | — | — | — | — | 0.0060 | — | — | — | — | — | — | 7.6 | Inv. ex. |
| A-22 | 0.0016 | 2.98 | 0.20 | 0.29 | 0.010 | 0.0011 | — | — | — | — | — | — | — | 0.0049 | — | — | — | — | — | 3.4 | Inv. ex. |
| A-23 | 0.0008 | 2.06 | 0.16 | 0.15 | 0.008 | 0.0007 | — | — | — | — | — | — | — | 0.0007 | — | — | — | — | — | 2.2 | Inv. ex. |
| A-24 | 0.0028 | 3.83 | 2.38 | 2.80 | 0.194 | 0.0026 | — | — | — | — | — | — | — | 0.0040 | — | — | — | — | — | 7.1 | Inv. ex. |
| A-25 | 0.0019 | 2.99 | 0.19 | 0.31 | 0.011 | 0.0012 | — | — | — | — | — | — | — | — | 0.0049 | — | — | — | — | 3.4 | Inv. ex. |
| A-26 | 0.0006 | 2.30 | 0.12 | 0.20 | 0.009 | 0.0007 | — | — | — | — | — | — | — | — | 0.0006 | — | — | — | — | 2.6 | Inv. ex. |
| A-27 | 0.0026 | 3.88 | 2.39 | 2.97 | 0.185 | 0.0026 | — | — | — | — | — | — | — | — | 0.0060 | — | — | — | — | 7.4 | Inv. ex. |
| A-28 | 0.0020 | 2.95 | 0.19 | 0.29 | 0.010 | 0.0014 | — | — | — | — | — | — | — | — | — | 0.0041 | — | — | — | 3.4 | Inv. ex. |
| A-29 | 0.0006 | 2.20 | 0.14 | 0.21 | 0.006 | 0.0009 | — | — | — | — | — | — | — | — | — | 0.0005 | — | — | — | 2.5 | Inv. ex. |
| A-30 | 0.0025 | 3.86 | 2.20 | 2.86 | 0.169 | 0.0027 | — | — | — | — | — | — | — | — | — | 0.0056 | — | — | — | 7.4 | Inv. ex. |
| A-31 | 0.0017 | 2.98 | 0.19 | 0.31 | 0.010 | 0.0014 | 0.0048 | — | — | — | — | — | — | — | — | — | 0.0600 | — | — | 3.4 | Inv. ex. |
| A-32 | 0.0008 | 2.12 | 0.13 | 0.19 | 0.008 | 0.0008 | 0.0048 | — | — | — | — | — | — | — | — | — | 0.0006 | — | — | 2.4 | Inv. ex. |
| A-33 | 0.0025 | 3.94 | 2.31 | 2.91 | 0.199 | 0.0028 | 0.0040 | — | — | — | — | — | — | — | — | — | 0.0070 | — | — | 7.5 | Inv. ex. |
| A-34 | 0.0018 | 2.97 | 0.20 | 0.28 | 0.011 | 0.0013 | 0.0045 | — | — | — | — | — | — | — | — | — | — | 0.0700 | — | 3.3 | Inv. ex. |
| A-35 | 0.0006 | 2.10 | 0.18 | 0.14 | 0.007 | 0.0007 | 0.0043 | — | — | — | — | — | — | — | — | — | — | 0.0005 | — | 2.2 | Inv. ex. |
| A-36 | 0.0027 | 3.97 | 2.30 | 2.89 | 0.188 | 0.0027 | 0.0044 | — | — | — | — | — | — | — | — | — | — | 0.0048 | — | 7.5 | Inv. ex. |
| A-37 | 0.0016 | 2.98 | 0.18 | 0.31 | 0.010 | 0.0012 | 0.0043 | — | — | — | — | — | — | — | — | — | — | — | 1.5 | 3.4 | Inv. ex. |
| A-38 | 0.0016 | 2.98 | 0.18 | 0.31 | 0.010 | 0.0012 | 0.0043 | — | — | — | — | — | — | — | — | — | — | — | 1.5 | 3.4 | Inv. ex. |
| A-39 | 0.0008 | 2.03 | 0.01 | 0.12 | 0.010 | 0.0008 | 0.0042 | — | — | — | — | — | — | — | — | — | — | — | 1.5 | 2.3 | Inv. ex. |
| A-40 | 0.0028 | 3.89 | 2.29 | 2.88 | 0.192 | 0.0025 | 0.0043 | — | — | — | — | — | — | — | — | — | — | — | 1.8 | 7.4 | Inv. ex. |
| A-41 | 0.0018 | 2.97 | 0.19 | 0.29 | 0.013 | 0.0012 | 0.0045 | — | — | — | — | — | — | — | — | — | — | — | — | 3.4 | Comp. ex. |
| A-42 | 0.0016 | 2.96 | 0.19 | 0.30 | 0.013 | 0.0015 | 0.0048 | — | — | — | — | — | — | — | — | — | — | — | — | 3.4 | Comp. ex. |
| A-43 | 0.0015 | 2.92 | 0.18 | 0.29 | 0.014 | 0.0013 | 0.0044 | — | — | — | — | — | — | — | — | — | — | — | — | 3.3 | Comp. ex. |
| A-44 | 0.0018 | 2.97 | 0.19 | 0.31 | 0.010 | 0.0015 | 0.0043 | — | — | — | — | — | — | — | — | — | — | — | — | 3.4 | Comp. ex. |
| A-45 | 0.0020 | 2.96 | 0.18 | 0.30 | 0.014 | 0.0012 | 0.0044 | — | — | — | — | — | — | — | — | — | — | — | — | 3.4 | Comp. ex. |
| A-46 | 0.0016 | 2.92 | 0.20 | 0.28 | 0.011 | 0.0012 | 0.0042 | — | — | — | — | — | — | — | — | — | — | — | — | 3.3 | Comp. ex. |
| A-47 | 0.0020 | 2.97 | 0.20 | 0.28 | 0.010 | 0.0012 | 0.0044 | — | — | — | — | — | — | — | — | — | — | — | — | 3.3 | Comp. ex. |

TABLE 1-continued

| | | | | | | | | | | | | | | | | | | | | |
|---|---|---|---|---|---|---|---|---|---|---|---|---|---|---|---|---|---|---|---|---|
| A-48 | 0.0016 | 2.94 | 0.20 | 0.29 | 0.013 | 0.0011 | 0.0044 | — | — | — | — | — | — | — | — | — | — | — | — | 3.3 | Comp. ex. |
| A-49 | 0.0020 | 2.95 | 0.20 | 0.32 | 0.012 | 0.0012 | 0.0045 | — | — | — | — | — | — | — | — | — | — | — | — | 3.4 | Comp. ex. |
| A-50 | 0.0017 | 2.98 | 0.20 | 0.30 | 0.013 | 0.0012 | — | — | — | — | — | — | — | — | — | — | — | — | — | 3.4 | Comp. ex. |
| A-51 | 0.0018 | 2.50 | 1.41 | 0.30 | 0.014 | 0.0013 | 0.0048 | — | — | — | — | — | — | — | — | — | — | — | — | 1.7 | Comp. ex. |
| A-52 | 0.0020 | 2.49 | 1.70 | 0.29 | 0.012 | 0.0012 | 0.0044 | — | — | — | — | — | — | — | — | — | — | — | — | 1.4 | Comp. ex. |
| A-53 | 0.0015 | 2.45 | 1.93 | 0.29 | 0.014 | 0.0013 | 0.0048 | — | — | — | — | — | — | — | — | — | — | — | — | 1.1 | Comp. ex. |
| A-54 | 0.0014 | 2.41 | 2.26 | 0.29 | 0.013 | 0.0010 | 0.0044 | — | — | — | — | — | — | — | — | — | — | — | — | 0.7 | Comp. ex. |
| A-55 | 0.0016 | 2.98 | 2.25 | 0.29 | 0.011 | 0.0011 | 0.0040 | — | — | — | — | — | — | — | — | — | — | — | — | 1.3 | Comp. ex. |
| A-56 | 0.0015 | 2.92 | 2.26 | 0.59 | 0.013 | 0.0012 | 0.0046 | — | — | — | — | — | — | — | — | — | — | — | — | 1.8 | Comp. ex. |
| A-57 | 0.0006 | 2.11 | 0.11 | 0.12 | 0.008 | 0.0008 | 0.0007 | — | — | — | — | — | — | — | — | — | — | — | — | 2.2 | Inv. ex. |
| A-58 | 0.0008 | 2.12 | 0.12 | 0.11 | 0.0006 | 0.0007 | 0.0006 | — | — | — | — | — | — | — | — | — | — | — | — | 2.2 | Comp. ex. |

TABLE 2

| No. | Si | {100} intensity of texture before stress relief annealing | Grain size before stress relief annealing (μm) | Magnetic properties before stress relief annealing W10/400 (W/kg) | B50 (T) | Magnetic properties after stress relief annealing W10/400 (W/kg) | B50 (T) | Tensile strength before stress relief annealing (MPa) | No. of 100 nm or less Cu particles before stress relief annealing (/10 μm2) | Remarks |
|---|---|---|---|---|---|---|---|---|---|---|
| A-1 | 2.95 | 2.5 | 21 | 39.9 | 1.69 | 8.5 | 1.71 | 685 | 0 | Inv. ex. |
| A-2 | 2.10 | 2.6 | 21 | 45.4 | 1.74 | 9.1 | 1.76 | 600 | 0 | Inv. ex. |
| A-3 | 3.90 | 3.1 | 19 | 32.4 | 1.60 | 7.8 | 1.65 | 788 | 0 | Inv. ex. |
| A-4 | 2.96 | 2.9 | 21 | 39.6 | 1.70 | 8.5 | 1.72 | 683 | 0 | Inv. ex. |
| A-5 | 2.00 | 2.6 | 21 | 44.3 | 1.74 | 9.2 | 1.76 | 617 | 0 | Inv. ex. |
| A-6 | 3.95 | 2.7 | 22 | 31.2 | 1.61 | 7.8 | 1.64 | 788 | 0 | Inv. ex. |
| A-7 | 2.97 | 2.9 | 18 | 39.7 | 1.69 | 8.6 | 1.71 | 677 | 0 | Inv. ex. |
| A-8 | 2.10 | 2.9 | 20 | 44.7 | 1.73 | 9.1 | 1.75 | 612 | 0 | Inv. ex. |
| A-9 | 3.97 | 2.7 | 19 | 32.0 | 1.61 | 7.8 | 1.65 | 789 | 0 | Inv. ex. |
| A-10 | 2.98 | 2.7 | 22 | 40.4 | 1.70 | 8.4 | 1.71 | 680 | 0 | Inv. ex. |
| A-11 | 2.20 | 3.0 | 21 | 45.9 | 1.74 | 9.1 | 1.75 | 607 | 0 | Inv. ex. |
| A-12 | 3.99 | 3.0 | 21 | 32.4 | 1.60 | 7.8 | 1.64 | 774 | 0 | Inv. ex. |
| A-13 | 2.96 | 3.1 | 22 | 39.8 | 1.69 | 8.5 | 1.71 | 673 | 0 | Inv. ex. |
| A-14 | 2.15 | 3.0 | 19 | 44.5 | 1.73 | 9.1 | 1.76 | 617 | 0 | Inv. ex. |
| A-15 | 3.96 | 2.8 | 20 | 31.4 | 1.61 | 7.9 | 1.65 | 777 | 0 | Inv. ex. |
| A-16 | 3.00 | 2.9 | 22 | 40.2 | 1.69 | 8.5 | 1.71 | 675 | 0 | Inv. ex. |
| A-17 | 2.22 | 2.6 | 21 | 44.3 | 1.73 | 9.0 | 1.76 | 601 | 0 | Inv. ex. |
| A-18 | 3.87 | 2.8 | 21 | 32.9 | 1.61 | 7.8 | 1.65 | 771 | 0 | Inv. ex. |
| A-19 | 2.95 | 2.7 | 21 | 39.7 | 1.70 | 8.5 | 1.72 | 688 | 0 | Inv. ex. |
| A-20 | 2.13 | 3.0 | 22 | 44.0 | 1.73 | 9.1 | 1.75 | 604 | 0 | Inv. ex. |
| A-21 | 3.97 | 2.6 | 18 | 32.7 | 1.60 | 7.9 | 1.64 | 773 | 0 | Inv. ex. |
| A-22 | 2.98 | 3.0 | 22 | 39.8 | 1.69 | 8.5 | 1.71 | 674 | 0 | Inv. ex. |
| A-23 | 2.06 | 3.0 | 20 | 45.6 | 1.73 | 9.0 | 1.76 | 619 | 0 | Inv. ex. |
| A-24 | 3.63 | 3.0 | 19 | 31.7 | 1.60 | 7.8 | 1.65 | 783 | 0 | Inv. ex. |
| A-25 | 2.99 | 2.9 | 21 | 39.8 | 1.69 | 8.7 | 1.71 | 675 | 0 | Inv. ex. |
| A-26 | 2.30 | 3.0 | 19 | 45.4 | 1.73 | 9.2 | 1.75 | 606 | 0 | Inv. ex. |
| A-27 | 3.88 | 2.9 | 22 | 31.3 | 1.60 | 7.9 | 1.64 | 786 | 0 | Inv. ex. |
| A-28 | 2.95 | 2.8 | 21 | 39.6 | 1.70 | 8.6 | 1.72 | 679 | 0 | Inv. ex. |
| A-29 | 2.20 | 3.0 | 19 | 44.0 | 1.73 | 9.0 | 1.76 | 604 | 0 | Inv. ex. |
| A-30 | 3.86 | 2.6 | 19 | 32.0 | 1.60 | 7.8 | 1.65 | 780 | 0 | Inv. ex. |
| A-31 | 2.98 | 2.9 | 20 | 40.4 | 1.69 | 8.6 | 1.71 | 684 | 0 | Inv. ex. |
| A-32 | 2.12 | 2.7 | 19 | 45.6 | 1.74 | 9.0 | 1.76 | 600 | 0 | Inv. ex. |
| A-33 | 3.94 | 2.9 | 21 | 32.4 | 1.61 | 7.8 | 1.65 | 778 | 0 | Inv. ex. |
| A-34 | 2.97 | 2.6 | 20 | 39.7 | 1.69 | 8.6 | 1.71 | 674 | 0 | Inv. ex. |
| A-35 | 2.10 | 2.8 | 19 | 44.7 | 1.73 | 9.1 | 1.76 | 615 | 0 | Inv. ex. |
| A-36 | 3.97 | 3.0 | 20 | 32.9 | 1.60 | 7.9 | 1.64 | 790 | 0 | Inv. ex. |
| A-37 | 2.98 | 2.5 | 22 | 39.5 | 1.69 | 8.4 | 1.71 | 686 | 2 | Inv. ex. |
| A-38 | 2.98 | 2.7 | 20 | 38.1 | 1.70 | 8.6 | 1.71 | 730 | 105 | Inv. ex. |
| A-39 | 2.03 | 2.6 | 21 | 46.0 | 1.74 | 9.1 | 1.76 | 657 | 102 | Inv. ex. |
| A-40 | 3.89 | 3.0 | 19 | 31.7 | 1.60 | 7.8 | 1.65 | 807 | 103 | Inv. ex. |
| A-41 | 2.97 | 0.3 | 102 | 10.6 | 1.65 | 10.5 | 1.62 | 460 | 0 | Comp. ex. |
| A-42 | 2.96 | 0.4 | 90 | 10.7 | 1.65 | 10.3 | 1.61 | 455 | 0 | Comp. ex. |
| A-43 | 2.92 | 0.4 | 101 | 10.5 | 1.64 | 10.4 | 1.61 | 456 | 0 | Comp. ex. |
| A-44 | 2.97 | 2.6 | 100 | 10.2 | 1.70 | 10.1 | 1.70 | 469 | 0 | Comp. ex. |
| A-45 | 2.96 | 3.0 | 86 | 10.2 | 1.69 | 10.0 | 1.69 | 466 | 0 | Comp. ex. |
| A-46 | 2.92 | 2.8 | 95 | 10.2 | 1.70 | 10.0 | 1.70 | 464 | 0 | Comp. ex. |
| A-47 | 2.97 | 0.3 | 18 | 40.0 | 1.63 | 10.0 | 1.61 | 681 | 0 | Comp. ex. |
| A-48 | 2.94 | 0.6 | 19 | 40.0 | 1.63 | 10.0 | 1.61 | 673 | 0 | Comp. ex. |
| A-49 | 2.95 | 0.5 | 20 | 40.2 | 1.63 | 10.0 | 1.61 | 670 | 0 | Comp. ex. |
| A-50 | 2.98 | 2.5 | 20 | 39.9 | 1.69 | 29.8 | 1.69 | 678 | 0 | Comp. ex. |
| A-51 | 2.50 | 0.4 | 21 | 39.4 | 1.63 | 12.8 | 1.61 | 676 | 0 | Comp. ex. |
| A-52 | 2.49 | 0.3 | 18 | 38.5 | 1.62 | 12.3 | 1.60 | 689 | 0 | Comp. ex. |
| A-53 | 2.45 | 0.3 | 20 | 37.1 | 1.61 | 11.0 | 1.59 | 699 | 0 | Comp. ex. |
| A-54 | 2.41 | 0.3 | 20 | 35.8 | 1.60 | 10.8 | 1.58 | 705 | 0 | Comp. ex. |
| A-55 | 2.98 | 0.5 | 21 | 33.7 | 1.58 | 10.2 | 1.56 | 727 | 0 | Comp. ex. |
| A-56 | 2.92 | 0.3 | 22 | 32.3 | 1.57 | 9.8 | 1.55 | 750 | 0 | Comp. ex. |
| A-57 | 2.11 | 2.6 | 28 | 43.2 | 1.74 | 9.1 | 1.76 | 603 | 0 | Inv. ex. |
| A-58 | 2.12 | 2.7 | 35 | 40.1 | 1.74 | 9.1 | 1.76 | 582 | 0 | Comp. ex. |

Example 2

30 mm thick slabs and 250 mm thick slabs having the chemical compositions shown in the following Table 3 were prepared. Next, the slabs were hot rolled to prepare 2.0 mm thick hot rolled sheets. The slab reheating temperature at that time was 1200° C., the finishing temperature was 850° C., and the coiling temperature was 650° C. After that, the sheets were pickled to remove the surface layer scale. After that, they were cold rolled to 0.25 mm. The finish annealing operations were performed at 750° C. for 1 minute. B-38 to 40 were annealed at 600° C. for 1 minute after finish annealing as treatment for precipitation of Cu.

The obtained non-oriented electrical steel sheets were measured for {100} crystal texture, average grain size, tensile strength, number of Cu precipitates, core loss W10/400, and magnetic flux density B50 by methods similar to Example 1. The subsequent tensile test and stress relief annealing were performed in the same way as Example 1. The results are shown in Table 4.

The materials made from the 30 mm thick slabs had {100} intensities after finish annealing of larger than 2.4 (B-1 to 40, B-44 to 46, B-50, and B-57 to 58). The materials made from the 250 mm thick slabs had {100} intensities after finish annealing of lower than 2.4 (B-41 to 43 and B47 to 49). B-51 to 56 were made from slabs of 30 mm thickness, but had Q of less than 2.0, so had {100} intensities after finish annealing of lower than 2.4. The crystal grain sizes became about 20 μm or so in materials finished annealed at 750° C. (B-1 to 40 and B-47 to 57) and about 100 μm in materials finish annealed at 1050° C. (B-41 to 46).

B-1 to 30 were changed in various additive elements. Whatever the additive elements added, the effect of greatly lowering the core loss after stress relief annealing was obtained. B-31 to 40 had optional additive elements added to them. Even if adding optional additive elements, the effect of the core loss greatly falling at the time of stress relief annealing remained unchanged. B-37 to 40 had Cu added as an optional additive element. Among these, B-38 to 40 are invention examples treated to cause precipitation of metal particles. The average size and number of precipitates of metal Cu particles in B-38 to 40 were respectively about 30 nm and about 100/10 $\mu m^2$. Due to this precipitation treatment, if comparing B-38 to 40 and the Invention Examples B-1 to 3 of similar constituents, it is learned that between B-1 and B-38, B-2 and B-39, and B-3 and B-40, the ones treated to cause precipitation were higher in tensile strength. Therefore, by adding Cu as an optional additive element and performing treatment for precipitation of metal particles, the effect is obtained that it is possible to make the tensile strength particularly high.

B-1 and 41 to 49 are almost the same in constituents and are changed in manufacturing conditions. By increasing the {100} intensity or making the crystal grains before stress relief annealing smaller to make them coarser after stress relief annealing, there is the effect of lowering the core loss, but it is learned that when combining the two, it is possible to reduce the core loss after stress relief annealing more due to the effect of synergy. Note that, regarding the core loss after stress relief annealing, a core loss when Si is 2.0 to 2.3% of 9.5 W/kg or less, a core loss when Si is 2.4 to 3.1% of 9.0 W/kg or less, and a core loss when Si is 3.8 to 4.0% of 8.5 W/kg or less are deemed passing levels. Core losses higher than these are reached even without using the present invention, so are deemed failing.

B-50 shows the properties when Mg and other elements for scavenging MnS are not included. Even if performing stress relief annealing, the crystal grain size failed to satisfactorily grow and as a result the core loss became worse.

B-41, 42, and 43 show comparative examples with {100} intensities of less than 2.4, but grain sizes of over 30 μm. Further, B-44, 45, 46, and 58 show comparative examples with {100} intensities of 2.4 or more, but grain sizes of over 30 μm. From these comparative examples, it will be learned that if the grain size becomes over 30 μm, sufficient tensile strength cannot be obtained.

B-51 to 56 show comparative examples with Q of less than 2.0. In these comparative examples, the steel sheets do not become solely a-Fe phases, so the structures formed at the thin slab were lost at the phase transformation at the time of the slab reheating and the {100} intensities after finish annealing became lower than 2.4.

TABLE 3

| | Constituents (mass %) | | | | | | | | | | | | | | | | | | | | |
|---|---|---|---|---|---|---|---|---|---|---|---|---|---|---|---|---|---|---|---|---|---|
| No. | C | Si | Mn | Al | P | S | Mg | Ca | Sr | Ba | Ce | La | Nd | Pr | Zn | Cd | Sn | Cr | Cu | Q | Remarks |
| B-1 | 0.0017 | 2.96 | 0.19 | 0.30 | 0.011 | 0.0013 | 0.0045 | — | — | — | — | — | — | — | — | — | — | — | — | 3.4 | Inv. ex. |
| B-2 | 0.0008 | 2.05 | 0.13 | 0.12 | 0.007 | 0.0006 | 0.0006 | — | — | — | — | — | — | — | — | — | — | — | — | 2.2 | Inv. ex. |
| B-3 | 0.0028 | 3.92 | 2.30 | 2.90 | 0.190 | 0.0027 | 0.0080 | — | — | — | — | — | — | — | — | — | — | — | — | 7.4 | Inv. ex. |
| B-4 | 0.0018 | 2.95 | 0.18 | 0.28 | 0.013 | 0.0011 | — | 0.0040 | — | — | — | — | — | — | — | — | — | — | — | 3.3 | Inv. ex. |
| B-5 | 0.0007 | 2.11 | 0.21 | 0.12 | 0.006 | 0.0006 | — | 0.00510 | — | — | — | — | — | — | — | — | — | — | — | 2.1 | Inv. ex. |
| B-6 | 0.0026 | 3.95 | 2.38 | 2.85 | 0.191 | 0.0025 | — | 0.00590 | — | — | — | — | — | — | — | — | — | — | — | 7.3 | Inv. ex. |
| B-7 | 0.0020 | 2.98 | 0.18 | 0.31 | 0.011 | 0.0015 | — | — | 0.0043 | — | — | — | — | — | — | — | — | — | — | 3.4 | Inv. ex. |
| B-8 | 0.0008 | 2.12 | 0.16 | 0.14 | 0.008 | 0.0008 | — | — | 0.0006 | — | — | — | — | — | — | — | — | — | — | 2.2 | Inv. ex. |
| B-9 | 0.0025 | 3.92 | 2.30 | 2.95 | 0.197 | 0.0026 | — | — | 0.0060 | — | — | — | — | — | — | — | — | — | — | 7.5 | Inv. ex. |
| B-10 | 0.0017 | 2.99 | 0.18 | 0.32 | 0.010 | 0.0015 | — | — | — | 0.0047 | — | — | — | — | — | — | — | — | — | 3.4 | Inv. ex. |
| B-11 | 0.0007 | 2.04 | 0.14 | 0.14 | 0.009 | 0.0006 | — | — | — | 0.00058 | — | — | — | — | — | — | — | — | — | 2.2 | Inv. ex. |
| B-12 | 0.0026 | 3.93 | 2.40 | 2.98 | 0.195 | 0.0027 | — | — | — | 0.00310 | — | — | — | — | — | — | — | — | — | 7.5 | Inv. ex. |
| B-13 | 0.0019 | 2.95 | 0.18 | 0.29 | 0.011 | 0.0012 | — | — | — | — | 0.0045 | — | — | — | — | — | — | — | — | 3.4 | Inv. ex. |
| B-14 | 0.0007 | 2.14 | 0.15 | 0.11 | 0.007 | 0.0008 | — | — | — | — | 0.00054 | — | — | — | — | — | — | — | — | 2.2 | Inv. ex. |
| B-15 | 0.0027 | 3.88 | 2.31 | 2.89 | 0.189 | 0.0028 | — | — | — | — | 0.00590 | — | — | — | — | — | — | — | — | 7.4 | Inv. ex. |
| B-16 | 0.0019 | 2.98 | 0.20 | 0.28 | 0.010 | 0.0015 | — | — | — | — | — | 0.0046 | — | — | — | — | — | — | — | 3.3 | Inv. ex. |
| B-17 | 0.0007 | 2.01 | 0.19 | 0.17 | 0.008 | 0.0009 | — | — | — | — | — | 0.00069 | — | — | — | — | — | — | — | 2.2 | Inv. ex. |
| B-18 | 0.0026 | 3.89 | 2.39 | 2.97 | 0.196 | 0.0026 | — | — | — | — | — | 0.00730 | — | — | — | — | — | — | — | 7.4 | Inv. ex. |
| B-19 | 0.0019 | 2.99 | 0.19 | 0.31 | 0.013 | 0.0012 | — | — | — | — | — | — | 0.0041 | — | — | — | — | — | — | 3.4 | Inv. ex. |
| B-20 | 0.0009 | 2.15 | 0.13 | 0.12 | 0.012 | 0.0007 | — | — | — | — | — | — | 0.00058 | — | — | — | — | — | — | 2.3 | Inv. ex. |
| B-21 | 0.0025 | 3.97 | 2.37 | 2.94 | 0.179 | 0.0027 | — | — | — | — | — | — | 0.00690 | — | — | — | — | — | — | 7.5 | Inv. ex. |
| B-22 | 0.0017 | 2.96 | 0.19 | 0.30 | 0.013 | 0.0013 | — | — | — | — | — | — | — | 0.005 | — | — | — | — | — | 3.4 | Inv. ex. |
| B-23 | 0.0008 | 2.10 | 0.15 | 0.14 | 0.007 | 0.0009 | — | — | — | — | — | — | — | 0.00057 | — | — | — | — | — | 2.2 | Inv. ex. |
| B-24 | 0.0027 | 3.88 | 2.33 | 2.90 | 0.191 | 0.0028 | — | — | — | — | — | — | — | 0.00590 | — | — | — | — | — | 7.4 | Inv. ex. |
| B-25 | 0.0017 | 2.98 | 0.18 | 0.30 | 0.010 | 0.0014 | — | — | — | — | — | — | — | — | 0.004 | — | — | — | — | 3.4 | Inv. ex. |
| B-26 | 0.0009 | 2.11 | 0.17 | 0.17 | 0.006 | 0.0008 | — | — | — | — | — | — | — | — | 0.00059 | — | — | — | — | 2.3 | Inv. ex. |
| B-27 | 0.0027 | 3.92 | 2.37 | 2.93 | 0.194 | 0.0028 | — | — | — | — | — | — | — | — | 0.00490 | — | — | — | — | 7.4 | Inv. ex. |
| B-28 | 0.0018 | 2.96 | 0.20 | 0.32 | 0.011 | 0.0011 | — | — | — | — | — | — | — | — | — | 0.004 | — | — | — | 3.4 | Inv. ex. |
| B-29 | 0.0008 | 2.15 | 0.15 | 0.13 | 0.008 | 0.0008 | — | — | — | — | — | — | — | — | — | 0.00061 | — | — | — | 2.3 | Inv. ex. |
| B-30 | 0.0027 | 3.88 | 2.36 | 2.91 | 0.183 | 0.0027 | — | — | — | — | — | — | — | — | — | 0.00670 | — | — | — | 7.3 | Inv. ex. |
| B-31 | 0.0017 | 2.99 | 0.20 | 0.31 | 0.012 | 0.0012 | 0.0042 | — | — | — | — | — | — | — | — | — | 0.0600 | — | — | 3.4 | Inv. ex. |
| B-32 | 0.0008 | 2.03 | 0.16 | 0.12 | 0.012 | 0.0009 | 0.0005 | — | — | — | — | — | — | — | — | — | 0.0006 | — | — | 2.1 | Inv. ex. |
| B-33 | 0.0026 | 3.91 | 2.34 | 2.97 | 0.189 | 0.0026 | 0.0040 | — | — | — | — | — | — | — | — | — | 0.0061 | — | — | 7.5 | Inv. ex. |
| B-34 | 0.0016 | 2.96 | 0.20 | 0.28 | 0.014 | 0.0013 | 0.0045 | — | — | — | — | — | — | — | — | — | — | 0.0600 | — | 3.3 | Inv. ex. |
| B-35 | 0.0006 | 2.24 | 0.14 | 0.14 | 0.009 | 0.0006 | 0.0006 | — | — | — | — | — | — | — | — | — | — | 0.0007 | — | 2.4 | Inv. ex. |
| B-36 | 0.0025 | 3.99 | 2.38 | 2.98 | 0.189 | 0.0026 | 0.0042 | — | — | — | — | — | — | — | — | — | — | 0.0067 | — | 7.6 | Inv. ex. |
| B-37 | 0.0017 | 2.98 | 0.19 | 0.29 | 0.011 | 0.0014 | 0.0040 | — | — | — | — | — | — | — | — | — | — | — | 1.5 | 3.4 | Inv. ex. |
| B-38 | 0.0017 | 2.98 | 0.19 | 0.29 | 0.011 | 0.0014 | 0.0040 | — | — | — | — | — | — | — | — | — | — | — | 1.5 | 3.4 | Inv. ex. |
| B-39 | 0.0007 | 2.23 | 0.14 | 0.13 | 0.017 | 0.0008 | 0.0006 | — | — | — | — | — | — | — | — | — | — | — | 1.7 | 2.4 | Inv. ex. |
| B-40 | 0.0026 | 3.88 | 2.31 | 2.99 | 0.195 | 0.0028 | 0.0046 | — | — | — | — | — | — | — | — | — | — | — | 1.8 | 7.6 | Inv. ex. |
| B-41 | 0.0020 | 2.98 | 0.19 | 0.32 | 0.014 | 0.0011 | 0.0048 | — | — | — | — | — | — | — | — | — | — | — | — | 3.4 | Comp. ex. |
| B-42 | 0.0020 | 2.94 | 0.19 | 0.30 | 0.013 | 0.0014 | 0.0040 | — | — | — | — | — | — | — | — | — | — | — | — | 3.3 | Comp. ex. |
| B-43 | 0.0017 | 2.97 | 0.19 | 0.28 | 0.014 | 0.0012 | 0.0040 | — | — | — | — | — | — | — | — | — | — | — | — | 3.3 | Comp. ex. |
| B-44 | 0.0017 | 2.97 | 0.19 | 0.30 | 0.011 | 0.0012 | 0.0042 | — | — | — | — | — | — | — | — | — | — | — | — | 3.4 | Comp. ex. |
| B-45 | 0.0016 | 2.98 | 0.20 | 0.32 | 0.013 | 0.0013 | 0.0043 | — | — | — | — | — | — | — | — | — | — | — | — | 3.4 | Comp. ex. |
| B-46 | 0.0018 | 2.98 | 0.20 | 0.32 | 0.012 | 0.0014 | 0.0049 | — | — | — | — | — | — | — | — | — | — | — | — | 3.4 | Comp. ex. |
| B-47 | 0.0018 | 2.99 | 0.19 | 0.31 | 0.015 | 0.0011 | 0.0050 | — | — | — | — | — | — | — | — | — | — | — | — | 3.4 | Comp. ex. |
| B-48 | 0.0019 | 2.95 | 0.19 | 0.28 | 0.015 | 0.0013 | 0.0044 | — | — | — | — | — | — | — | — | — | — | — | — | 3.3 | Comp. ex. |

TABLE 3-continued

| | | | | | | | | | | | | | | | | | | | | | |
|---|---|---|---|---|---|---|---|---|---|---|---|---|---|---|---|---|---|---|---|---|---|
| B-49 | 0.0019 | 2.98 | 0.19 | 0.30 | 0.012 | 0.0014 | 0.0049 | — | — | — | — | — | — | — | — | — | — | — | — | 3.4 | Comp. ex. |
| B-50 | 0.0019 | 2.95 | 0.19 | 0.30 | 0.013 | 0.0012 | — | — | — | — | — | — | — | — | — | — | — | — | — | 3.4 | Comp. ex. |
| B-51 | 0.0016 | 2.43 | 1.49 | 0.30 | 0.015 | 0.0012 | 0.0049 | — | — | — | — | — | — | — | — | — | — | — | — | 1.5 | Comp. ex. |
| B-52 | 0.0017 | 2.41 | 1.77 | 0.30 | 0.014 | 0.0012 | 0.0050 | — | — | — | — | — | — | — | — | — | — | — | — | 1.2 | Comp. ex. |
| B-53 | 0.0019 | 2.45 | 1.94 | 0.28 | 0.013 | 0.0013 | 0.0045 | — | — | — | — | — | — | — | — | — | — | — | — | 1.1 | Comp. ex. |
| B-54 | 0.0018 | 2.42 | 2.29 | 0.29 | 0.013 | 0.0011 | 0.0045 | — | — | — | — | — | — | — | — | — | — | — | — | 0.7 | Comp. ex. |
| B-55 | 0.0019 | 2.90 | 2.24 | 0.29 | 0.013 | 0.0014 | 0.0048 | — | — | — | — | — | — | — | — | — | — | — | — | 1.3 | Comp. ex. |
| B-56 | 0.0018 | 2.92 | 2.28 | 0.60 | 0.014 | 0.0012 | 0.0045 | — | — | — | — | — | — | — | — | — | — | — | — | 1.8 | Comp. ex. |
| B-57 | 0.0008 | 2.12 | 0.11 | 0.11 | 0.007 | 0.0008 | 0.0006 | — | — | — | — | — | — | — | — | — | — | — | — | 2.2 | Inv. ex. |
| B-58 | 0.0008 | 2.13 | 0.11 | 0.13 | 0.007 | 0.0007 | 0.0007 | — | — | — | — | — | — | — | — | — | — | — | — | 2.3 | Comp. ex. |

TABLE 4

| No. | Si | {100} intensity of texture before stress relief annealing | Grain size before stress relief annealing (μm) | Magnetic properties before stress relief annealing W10/400 (W/kg) | B50 (T) | Magnetic properties after stress relief annealing W10/400 (W/kg) | B50 (T) | Tensile strength before stress relief annealing (MPa) | No. of 100 nm or less Cu particles before stress relief annealing (/10 μm2) | Remarks |
|---|---|---|---|---|---|---|---|---|---|---|
| B-1 | 2.96 | 2.7 | 21 | 39.9 | 1.69 | 8.6 | 1.71 | 681 | 0 | Inv. ex. |
| B-2 | 2.05 | 3.0 | 19 | 44.4 | 1.73 | 9.2 | 1.75 | 611 | 0 | Inv. ex. |
| B-3 | 3.92 | 2.8 | 22 | 31.3 | 1.60 | 7.9 | 1.65 | 786 | 0 | Inv. ex. |
| B-4 | 2.95 | 3.0 | 21 | 40.4 | 1.69 | 8.7 | 1.71 | 679 | 0 | Inv. ex. |
| B-5 | 2.11 | 3.1 | 22 | 45.5 | 1.74 | 9.1 | 1.75 | 600 | 0 | Inv. ex. |
| B-6 | 3.95 | 2.7 | 20 | 31.3 | 1.61 | 7.8 | 1.64 | 789 | 0 | Inv. ex. |
| B-7 | 2.98 | 2.7 | 20 | 40.0 | 1.70 | 8.5 | 1.72 | 683 | 0 | Inv. ex. |
| B-8 | 2.12 | 2.8 | 18 | 44.3 | 1.73 | 9.2 | 1.76 | 606 | 0 | Inv. ex. |
| B-9 | 3.92 | 2.8 | 19 | 31.8 | 1.60 | 7.8 | 1.65 | 783 | 0 | Inv. ex. |
| B-10 | 2.99 | 2.9 | 21 | 40.3 | 1.69 | 8.4 | 1.71 | 677 | 0 | Inv. ex. |
| B-11 | 2.04 | 3.0 | 21 | 45.8 | 1.73 | 9.1 | 1.75 | 602 | 0 | Inv. ex. |
| B-12 | 3.93 | 2.7 | 21 | 32.3 | 1.60 | 7.9 | 1.64 | 789 | 0 | Inv. ex. |
| B-13 | 2.95 | 2.8 | 22 | 40.2 | 1.69 | 8.5 | 1.71 | 682 | 0 | Inv. ex. |
| B-14 | 2.14 | 2.6 | 19 | 45.0 | 1.73 | 9.1 | 1.75 | 610 | 0 | Inv. ex. |
| B-15 | 3.88 | 3.0 | 19 | 32.8 | 1.60 | 7.8 | 1.64 | 771 | 0 | Inv. ex. |
| B-16 | 2.98 | 3.0 | 22 | 40.3 | 1.70 | 8.4 | 1.72 | 684 | 0 | Inv. ex. |
| B-17 | 2.01 | 3.0 | 18 | 44.6 | 1.73 | 9.1 | 1.76 | 601 | 0 | Inv. ex. |
| B-18 | 3.89 | 3.0 | 19 | 32.4 | 1.60 | 7.9 | 1.64 | 775 | 0 | Inv. ex. |
| B-19 | 2.99 | 3.1 | 20 | 40.0 | 1.70 | 8.4 | 1.72 | 682 | 0 | Inv. ex. |
| B-20 | 2.15 | 2.9 | 19 | 44.9 | 1.74 | 9.1 | 1.75 | 605 | 0 | Inv. ex. |
| B-21 | 3.97 | 3.1 | 21 | 31.6 | 1.60 | 7.8 | 1.64 | 782 | 0 | Inv. ex. |
| B-22 | 2.96 | 2.8 | 18 | 40.5 | 1.69 | 8.4 | 1.71 | 679 | 0 | Inv. ex. |
| B-23 | 2.10 | 2.9 | 21 | 44.7 | 1.74 | 9.0 | 1.75 | 616 | 0 | Inv. ex. |
| B-24 | 3.88 | 3.1 | 21 | 31.5 | 1.61 | 7.9 | 1.65 | 781 | 0 | Inv. ex. |
| B-25 | 2.98 | 2.8 | 19 | 39.9 | 1.70 | 8.3 | 1.72 | 681 | 0 | Inv. ex. |
| B-26 | 2.11 | 2.9 | 20 | 45.0 | 1.73 | 9.0 | 1.76 | 607 | 0 | Inv. ex. |
| B-27 | 3.92 | 2.9 | 21 | 31.3 | 1.60 | 7.8 | 1.64 | 788 | 0 | Inv. ex. |
| B-28 | 2.96 | 2.7 | 21 | 40.3 | 1.69 | 8.4 | 1.71 | 678 | 0 | Inv. ex. |
| B-29 | 2.15 | 2.9 | 20 | 44.6 | 1.74 | 9.0 | 1.76 | 618 | 0 | Inv. ex. |
| B-30 | 3.88 | 2.8 | 20 | 32.2 | 1.60 | 7.8 | 1.64 | 781 | 0 | Inv. ex. |
| B-31 | 2.99 | 2.7 | 19 | 40.3 | 1.70 | 8.6 | 1.72 | 676 | 0 | Inv. ex. |
| B-32 | 2.03 | 2.7 | 20 | 44.8 | 1.73 | 9.1 | 1.76 | 607 | 0 | Inv. ex. |
| B-33 | 3.91 | 2.6 | 20 | 32.4 | 1.61 | 7.9 | 1.64 | 775 | 0 | Inv. ex. |
| B-34 | 2.96 | 2.8 | 19 | 40.5 | 1.69 | 8.5 | 1.71 | 680 | 0 | Inv. ex. |
| B-35 | 2.24 | 2.8 | 20 | 44.3 | 1.73 | 9.0 | 1.76 | 619 | 0 | Inv. ex. |
| B-36 | 3.99 | 2.7 | 21 | 31.9 | 1.60 | 7.9 | 1.64 | 790 | 0 | Inv. ex. |
| B-37 | 2.98 | 2.6 | 22 | 39.7 | 1.70 | 8.6 | 1.72 | 682 | 3 | Inv. ex. |
| B-38 | 2.98 | 2.8 | 19 | 39.5 | 1.69 | 8.4 | 1.72 | 726 | 104 | Inv. ex. |
| B-39 | 2.23 | 2.9 | 21 | 44.5 | 1.73 | 9.2 | 1.76 | 660 | 103 | Inv. ex. |
| B-40 | 3.88 | 2.7 | 18 | 32.7 | 1.60 | 7.8 | 1.65 | 805 | 105 | Inv. ex. |
| B-41 | 2.98 | 0.3 | 103 | 10.6 | 1.64 | 10.3 | 1.61 | 466 | 0 | Comp. ex. |
| B-42 | 2.94 | 0.5 | 89 | 10.3 | 1.64 | 10.4 | 1.62 | 459 | 0 | Comp. ex. |
| B-43 | 2.97 | 0.6 | 91 | 10.6 | 1.65 | 10.5 | 1.61 | 462 | 0 | Comp. ex. |
| B-44 | 2.97 | 2.7 | 99 | 10.0 | 1.69 | 10.0 | 1.69 | 466 | 0 | Comp. ex. |
| B-45 | 2.98 | 3.1 | 103 | 10.2 | 1.69 | 10.1 | 1.69 | 457 | 0 | Comp. ex. |
| B-46 | 2.98 | 2.9 | 85 | 10.1 | 1.70 | 9.9 | 1.70 | 469 | 0 | Comp. ex. |
| B-47 | 2.99 | 0.4 | 22 | 39.0 | 1.62 | 10.1 | 1.62 | 663 | 0 | Comp. ex. |
| B-48 | 2.95 | 0.4 | 18 | 39.5 | 1.63 | 10.0 | 1.61 | 673 | 0 | Comp. ex. |
| B-49 | 2.98 | 0.5 | 16 | 38.1 | 1.62 | 10.1 | 1.61 | 673 | 0 | Comp. ex. |
| B-50 | 2.95 | 2.7 | 21 | 39.5 | 1.69 | 28.0 | 1.70 | 672 | 0 | Comp. ex. |
| B-51 | 2.43 | 0.4 | 20 | 39.0 | 1.63 | 12.9 | 1.61 | 679 | 0 | Comp. ex. |
| B-52 | 2.41 | 0.4 | 18 | 38.8 | 1.62 | 11.6 | 1.60 | 687 | 0 | Comp. ex. |
| B-53 | 2.45 | 0.5 | 19 | 37.2 | 1.61 | 11.5 | 1.59 | 699 | 0 | Comp. ex. |
| B-54 | 2.42 | 0.4 | 19 | 35.2 | 1.60 | 10.5 | 1.58 | 706 | 0 | Comp. ex. |
| B-55 | 2.90 | 0.5 | 20 | 33.6 | 1.58 | 10.2 | 1.56 | 725 | 0 | Comp. ex. |
| B-56 | 2.92 | 0.5 | 20 | 32.3 | 1.57 | 9.8 | 1.55 | 750 | 0 | Comp. ex. |
| B-57 | 2.12 | 2.6 | 27 | 43.1 | 1.74 | 9.0 | 1.76 | 604 | 0 | Inv. ex. |
| B-58 | 2.13 | 2.7 | 35 | 40.5 | 1.75 | 9.2 | 1.76 | 581 | 0 | Comp. ex. |

Example 3

250 mm thick slabs having the chemical compositions shown in the following Table 5 were prepared.

Next, the slabs were hot rolled to prepare 2.0 mm thick hot rolled sheets. The slab reheating temperature at that time was 1200° C., the finishing temperature was 850° C., and the coiling temperature was 650° C. Furthermore, at the time of hot rolling, to raise the lubrication ability with the rolls, as a lubricant, 10% grease was mixed into the hot rolling cooling water to make the average frictional coefficient between the finish hot rolling rolls and the steel sheets 0.25 or less. Further, there are also materials where the hot rolling was performed without mixing in grease. After that, the steel sheets were pickled to remove the surface scale. After that, they were cold rolled to 0.25 mm. The finish annealing was performed at 750° C. for 1 minute. C-38 to 40 were annealed at 600° C. for 1 minute after finish annealing as treatment for precipitation of Cu.

The obtained non-oriented electrical steel sheets were measured for {100} crystal texture, average grain size, tensile strength, number of Cu precipitates, core loss W10/400, and magnetic flux density B50 by methods similar to Example 1. The subsequent tensile test and stress relief annealing were performed in the same way as Example 1. The results are shown in Table 6.

The materials in which grease was mixed in at the time of hot rolling had {100} intensities after finish annealing of larger than 2.4 (C-1 to 40, C44 to 46, C-50, and C-57 to 58). The materials in which grease was not mixed in at the time of hot rolling had {100} intensities after finish annealing of lower than 2.4 (C-41 to 43 and C47 to 49). C-51 to 56 were materials in which grease was mixed in at the time of hot rolling, but had Q of less than 2.0, so had {100} intensities after finish annealing of lower than 2.4. The crystal grain sizes became about 20 μm or so in materials finished annealed at 750° C. (C1 to 40 and C47 to 57) and about 100 μm in materials finish annealed at 1050° C. (C-41 to 46).

C-1 to 30 were changed in various additive elements. Whatever the additive elements added, the effect of greatly lowering the core loss after stress relief annealing was obtained. C-31 to 40 had optional additive elements added to them. Even if adding optional additive elements, the effect of the core loss greatly falling at the time of stress relief annealing remained unchanged. C-37 to 40 had Cu added as an optional additive element. Among these, C-38 to 40 are invention examples treated to cause precipitation of metal particles. The average size and number of precipitates of metal Cu particles in C-38 to 40 were respectively about 30 nm and about 100/10 $\mu m^2$. Due to this precipitation treatment, if comparing C-38 to 40 and the Invention Examples C-1 to 3 of similar constituents, it is learned that between C-1 and C-38, C-2 and C-39, and C-3 and C-40, the ones treated to cause precipitation were higher in tensile strength. Therefore, by adding Cu as an optional additive element and performing treatment for precipitation of metal particles, the effect is obtained that it is possible to make the tensile strength particularly high.

C-1 and 41 to 49 are almost the same in constituents and are changed in manufacturing conditions. By increasing the {100} intensity or making the crystal grains before stress relief annealing smaller to make them coarser after stress relief annealing, there is the effect of lowering the core loss, but it is learned that when combining the two, it is possible to reduce the core loss after stress relief annealing more due to the synergistic effect. Note that, regarding the core loss after stress relief annealing, a core loss when Si is 2.0 to 2.3% of 9.5 W/kg or less, a core loss when Si is 2.4 to 3.1% of 9.0 W/kg or less, and a core loss when Si is 3.8 to 4.0% of 8.5 W/kg or less are deemed passing levels. Core losses higher than these are reached even without using the present invention, so are deemed failing.

C-50 shows the properties when Mg and other elements for scavenging MnS are not included. Even if performing stress relief annealing, the crystal grain size failed to satisfactorily grow and as a result the core loss became worse.

C-41, 42, and 43 show comparative examples with {100} intensities of less than 2.4, but grain sizes of over 30 μm. Further, C-44, 45, 46, and 58 show comparative examples with {100} intensities of 2.4 or more, but grain sizes of over 30 μm. From these comparative examples, it will be learned that if the grain size becomes over 30 μm, sufficient tensile strength cannot be obtained.

C-51 to 56 show comparative examples with Q of less than 2.0. In these comparative examples, the steel sheets do not become solely a-Fe phases, so at the time of lubricating rolling, they become y phases. In the subsequent phase transformation, the effect of lubricating rolling disappears, so the {100} intensities after finish annealing became lower than 2.4.

TABLE 5

| No. | Constituents (mass %) | | | | | | | | | | | | | | | | | | | Q | Remarks |
|---|---|---|---|---|---|---|---|---|---|---|---|---|---|---|---|---|---|---|---|---|---|
| | C | Si | Mn | Al | P | S | Mg | Ca | Sr | Ba | Ce | La | Nd | Pr | Zn | Cd | Sn | Cr | Cu | | |
| C-1 | 0.0015 | 3.00 | 0.19 | 0.30 | 0.013 | 0.0014 | 0.0041 | — | — | — | — | — | — | — | — | — | — | — | — | 3.4 | Inv. ex. |
| C-2 | 0.0006 | 2.13 | 0.13 | 0.13 | 0.009 | 0.0007 | 0.0006 | — | — | — | — | — | — | — | — | — | — | — | — | 2.3 | Inv. ex. |
| C-3 | 0.0027 | 3.95 | 2.34 | 2.95 | 0.180 | 0.0027 | 0.0052 | — | — | — | — | — | — | — | — | — | — | — | — | 7.5 | Inv. ex. |
| C-4 | 0.0015 | 2.98 | 0.19 | 0.32 | 0.011 | 0.0011 | — | 0.0050 | — | — | — | — | — | — | — | — | — | — | — | 3.4 | Inv. ex. |
| C-5 | 0.0008 | 2.14 | 0.16 | 0.15 | 0.007 | 0.0008 | — | 0.0005 | — | — | — | — | — | — | — | — | — | — | — | 2.3 | Inv. ex. |
| C-6 | 0.0027 | 3.90 | 2.36 | 2.91 | 0.196 | 0.0025 | — | 0.0060 | — | — | — | — | — | — | — | — | — | — | — | 7.4 | Inv. ex. |
| C-7 | 0.0020 | 2.96 | 0.19 | 0.29 | 0.012 | 0.0012 | — | — | 0.0043 | — | — | — | — | — | — | — | — | — | — | 3.3 | Inv. ex. |
| C-8 | 0.0007 | 2.16 | 0.16 | 0.16 | 0.009 | 0.0009 | — | — | 0.0005 | — | — | — | — | — | — | — | — | — | — | 2.3 | Inv. ex. |
| C-9 | 0.0028 | 3.94 | 2.29 | 2.89 | 0.187 | 0.0027 | — | — | 0.0073 | — | — | — | — | — | — | — | — | — | — | 7.4 | Inv. ex. |
| C-10 | 0.0017 | 2.96 | 0.18 | 0.32 | 0.012 | 0.0011 | — | — | — | 0.0047 | — | — | — | — | — | — | — | — | — | 3.4 | Inv. ex. |
| C-11 | 0.0008 | 2.21 | 0.16 | 0.13 | 0.006 | 0.0008 | — | — | — | 0.0006 | — | — | — | — | — | — | — | — | — | 2.3 | Inv. ex. |
| C-12 | 0.0026 | 3.88 | 2.35 | 2.97 | 0.182 | 0.0026 | — | — | — | 0.0053 | — | — | — | — | — | — | — | — | — | 7.5 | Inv. ex. |
| C-13 | 0.0018 | 2.95 | 0.19 | 0.31 | 0.012 | 0.0015 | — | — | — | — | 0.0044 | — | — | — | — | — | — | — | — | 3.4 | Inv. ex. |
| C-14 | 0.0009 | 2.10 | 0.13 | 0.15 | 0.015 | 0.0008 | — | — | — | — | 0.0006 | — | — | — | — | — | — | — | — | 2.3 | Inv. ex. |
| C-15 | 0.0026 | 3.98 | 2.38 | 2.96 | 0.195 | 0.0025 | — | — | — | — | 0.0060 | — | — | — | — | — | — | — | — | 7.5 | Inv. ex. |
| C-16 | 0.0017 | 2.96 | 0.19 | 0.28 | 0.013 | 0.0013 | — | — | — | — | — | 0.0041 | — | — | — | — | — | — | — | 3.3 | Inv. ex. |
| C-17 | 0.0007 | 2.21 | 0.17 | 0.14 | 0.007 | 0.0009 | — | — | — | — | — | 0.0007 | — | — | — | — | — | — | — | 2.3 | Inv. ex. |
| C-18 | 0.0028 | 3.84 | 2.33 | 2.89 | 0.192 | 0.0027 | — | — | — | — | — | 0.0075 | — | — | — | — | — | — | — | 7.3 | Inv. ex. |
| C-19 | 0.0018 | 2.99 | 0.18 | 0.30 | 0.011 | 0.0015 | — | — | — | — | — | — | 0.0046 | — | — | — | — | — | — | 3.4 | Inv. ex. |
| C-20 | 0.0006 | 2.11 | 0.14 | 0.14 | 0.009 | 0.0007 | — | — | — | — | — | — | 0.0006 | — | — | — | — | — | — | 2.3 | Inv. ex. |
| C-21 | 0.0027 | 3.95 | 2.39 | 2.91 | 0.188 | 0.0027 | — | — | — | — | — | — | 0.0070 | — | — | — | — | — | — | 7.4 | Inv. ex. |
| C-22 | 0.0019 | 2.96 | 0.20 | 0.32 | 0.013 | 0.0015 | — | — | — | — | — | — | — | 0.0046 | — | — | — | — | — | 3.4 | Inv. ex. |
| C-23 | 0.0008 | 2.14 | 0.12 | 0.14 | 0.008 | 0.0007 | — | — | — | — | — | — | — | 0.0006 | — | — | — | — | — | 2.3 | Inv. ex. |
| C-24 | 0.0025 | 3.93 | 2.39 | 2.88 | 0.187 | 0.0026 | — | — | — | — | — | — | — | 0.0060 | — | — | — | — | — | 7.3 | Inv. ex. |
| C-25 | 0.0015 | 2.99 | 0.20 | 0.31 | 0.013 | 0.0014 | — | — | — | — | — | — | — | — | 0.0047 | — | — | — | — | 3.4 | Inv. ex. |
| C-26 | 0.0009 | 2.20 | 0.13 | 0.14 | 0.006 | 0.0008 | — | — | — | — | — | — | — | — | 0.0006 | — | — | — | — | 2.4 | Inv. ex. |
| C-27 | 0.0027 | 3.87 | 2.33 | 2.94 | 0.189 | 0.0027 | — | — | — | — | — | — | — | — | 0.0050 | — | — | — | — | 7.4 | Inv. ex. |
| C-28 | 0.0019 | 2.98 | 0.19 | 0.29 | 0.014 | 0.0012 | — | — | — | — | — | — | — | — | — | 0.0040 | — | — | — | 3.4 | Inv. ex. |
| C-29 | 0.0009 | 2.10 | 0.17 | 0.08 | 0.009 | 0.0008 | — | — | — | — | — | — | — | — | — | 0.0006 | — | — | — | 2.1 | Inv. ex. |
| C-30 | 0.0027 | 3.88 | 2.34 | 2.97 | 0.197 | 0.0028 | — | — | — | — | — | — | — | — | — | 0.0066 | — | — | — | 7.5 | Inv. ex. |
| C-31 | 0.0019 | 2.97 | 0.19 | 0.31 | 0.013 | 0.0012 | 0.0044 | — | — | — | — | — | — | — | — | — | 0.0700 | — | — | 3.4 | Inv. ex. |
| C-32 | 0.0008 | 2.07 | 0.13 | 0.14 | 0.016 | 0.0007 | 0.0005 | — | — | — | — | — | — | — | — | — | 0.0006 | — | — | 2.2 | Inv. ex. |
| C-33 | 0.0026 | 3.91 | 2.36 | 2.81 | 0.189 | 0.0026 | 0.0055 | — | — | — | — | — | — | — | — | — | 0.0060 | — | — | 7.2 | Inv. ex. |
| C-34 | 0.0017 | 2.98 | 0.20 | 0.30 | 0.012 | 0.0014 | 0.0041 | — | — | — | — | — | — | — | — | — | — | 0.0600 | — | 3.4 | Inv. ex. |
| C-35 | 0.0008 | 2.10 | 0.16 | 0.13 | 0.006 | 0.0007 | 0.0006 | — | — | — | — | — | — | — | — | — | — | 0.0007 | — | 2.2 | Inv. ex. |
| C-36 | 0.0025 | 3.98 | 2.37 | 2.87 | 0.195 | 0.0025 | 0.0045 | — | — | — | — | — | — | — | — | — | — | 0.0068 | — | 7.4 | Inv. ex. |
| C-37 | 0.0016 | 3.00 | 0.19 | 0.31 | 0.012 | 0.0013 | 0.0041 | — | — | — | — | — | — | — | — | — | — | — | 1.6 | 3.4 | Inv. ex. |
| C-38 | 0.0016 | 3.00 | 0.19 | 0.31 | 0.012 | 0.0013 | 0.0041 | — | — | — | — | — | — | — | — | — | — | — | 1.6 | 3.4 | Inv. ex. |
| C-39 | 0.0006 | 2.21 | 0.14 | 0.14 | 0.008 | 0.0008 | 0.0005 | — | — | — | — | — | — | — | — | — | — | — | 1.6 | 2.4 | Inv. ex. |
| C-40 | 0.0026 | 3.88 | 2.36 | 2.92 | 0.191 | 0.0026 | 0.0053 | — | — | — | — | — | — | — | — | — | — | — | 1.9 | 7.4 | Inv. ex. |
| C-41 | 0.0019 | 2.97 | 0.20 | 0.31 | 0.014 | 0.0012 | 0.0054 | — | — | — | — | — | — | — | — | — | — | — | — | 3.4 | Comp. ex. |
| C-42 | 0.0020 | 2.98 | 0.19 | 0.31 | 0.012 | 0.0014 | 0.0045 | — | — | — | — | — | — | — | — | — | — | — | — | 3.4 | Comp. ex. |
| C-43 | 0.0020 | 2.96 | 0.19 | 0.31 | 0.014 | 0.0013 | 0.0048 | — | — | — | — | — | — | — | — | — | — | — | — | 3.4 | Comp. ex. |
| C-44 | 0.0018 | 2.98 | 0.19 | 0.29 | 0.012 | 0.0011 | 0.0047 | — | — | — | — | — | — | — | — | — | — | — | — | 3.4 | Comp. ex. |
| C-45 | 0.0019 | 2.97 | 0.19 | 0.29 | 0.014 | 0.0012 | 0.0049 | — | — | — | — | — | — | — | — | — | — | — | — | 3.3 | Comp. ex. |
| C-46 | 0.0017 | 2.95 | 0.20 | 0.31 | 0.011 | 0.0014 | 0.0043 | — | — | — | — | — | — | — | — | — | — | — | — | 3.4 | Comp. ex. |
| C-47 | 0.0019 | 2.98 | 0.20 | 0.32 | 0.012 | 0.0014 | 0.0048 | — | — | — | — | — | — | — | — | — | — | — | — | 3.4 | Comp. ex. |

TABLE 5-continued

| | | | | | | | | | | | | | | | | | | | | | |
|---|---|---|---|---|---|---|---|---|---|---|---|---|---|---|---|---|---|---|---|---|---|
| C-48 | 0.0019 | 2.98 | 0.20 | 0.29 | 0.015 | 0.0013 | 0.0041 | — | — | — | — | — | — | — | — | — | — | — | — | 3.4 | Comp. ex. |
| C-49 | 0.0016 | 2.98 | 0.20 | 0.31 | 0.012 | 0.0013 | 0.0046 | — | — | — | — | — | — | — | — | — | — | — | — | 3.4 | Comp. ex. |
| C-50 | 0.0017 | 2.94 | 0.20 | 0.29 | 0.012 | 0.0014 | — | — | — | — | — | — | — | — | — | — | — | — | — | 3.3 | Comp. ex. |
| C-51 | 0.0016 | 2.43 | 1.49 | 0.30 | 0.013 | 0.0012 | 0.0044 | — | — | — | — | — | — | — | — | — | — | — | — | 1.5 | Comp. ex. |
| C-52 | 0.0015 | 2.42 | 1.77 | 0.30 | 0.012 | 0.0012 | 0.0042 | — | — | — | — | — | — | — | — | — | — | — | — | 1.3 | Comp. ex. |
| C-53 | 0.0019 | 2.46 | 1.91 | 0.29 | 0.014 | 0.0013 | 0.0047 | — | — | — | — | — | — | — | — | — | — | — | — | 1.1 | Comp. ex. |
| C-54 | 0.0019 | 2.50 | 2.30 | 0.29 | 0.014 | 0.0010 | 0.0042 | — | — | — | — | — | — | — | — | — | — | — | — | 0.8 | Comp. ex. |
| C-55 | 0.0018 | 3.00 | 2.30 | 0.29 | 0.012 | 0.0012 | 0.0045 | — | — | — | — | — | — | — | — | — | — | — | — | 1.3 | Comp. ex. |
| C-56 | 0.0016 | 2.97 | 2.22 | 0.60 | 0.013 | 0.0011 | 0.0041 | — | — | — | — | — | — | — | — | — | — | — | — | 1.9 | Comp. ex. |
| C-57 | 0.0006 | 2.12 | 0.12 | 0.11 | 0.008 | 0.0007 | 0.0007 | — | — | — | — | — | — | — | — | — | — | — | — | 2.2 | Inv. ex. |
| C-58 | 0.0007 | 2.12 | 0.12 | 0.12 | 0.007 | 0.0008 | 0.0007 | — | — | — | — | — | — | — | — | — | — | — | — | 2.2 | Comp. ex. |

TABLE 6

| No. | Si | {100} intensity of texture before stress relief annealing | Grain size before stress relief annealing (μm) | Magnetic properties before stress relief annealing W10/400 (W/kg) | B50 (T) | Magnetic properties after stress relief annealing W10/400 (W/kg) | B50 (T) | Tensile strength before stress relief annealing (MPa) | No. of 100 nm or less Cu particles before stress relief annealing (/10 μm2) | Remarks |
|---|---|---|---|---|---|---|---|---|---|---|
| C-1 | 3.00 | 2.7 | 18 | 40.0 | 1.70 | 8.4 | 1.72 | 678 | 0 | Inv. ex. |
| C-2 | 2.13 | 2.9 | 19 | 44.8 | 1.73 | 9.0 | 1.75 | 600 | 0 | Inv. ex. |
| C-3 | 3.95 | 2.6 | 22 | 32.5 | 1.61 | 7.8 | 1.65 | 779 | 0 | Inv. ex. |
| C-4 | 2.98 | 3.0 | 19 | 40.3 | 1.70 | 8.6 | 1.72 | 684 | 0 | Inv. ex. |
| C-5 | 2.14 | 3.1 | 18 | 45.0 | 1.74 | 9.2 | 1.76 | 602 | 0 | Inv. ex. |
| C-6 | 3.90 | 2.9 | 20 | 31.0 | 1.60 | 7.8 | 1.65 | 772 | 0 | Inv. ex. |
| C-7 | 2.96 | 3.1 | 21 | 39.8 | 1.69 | 8.4 | 1.71 | 678 | 0 | Inv. ex. |
| C-8 | 2.16 | 2.8 | 20 | 45.8 | 1.74 | 9.1 | 1.75 | 612 | 0 | Inv. ex. |
| C-9 | 3.94 | 2.8 | 19 | 32.6 | 1.60 | 7.8 | 1.64 | 787 | 0 | Inv. ex. |
| C-10 | 2.96 | 3.0 | 19 | 40.0 | 1.70 | 8.3 | 1.72 | 683 | 0 | Inv. ex. |
| C-11 | 2.21 | 2.9 | 20 | 45.2 | 1.74 | 9.1 | 1.76 | 608 | 0 | Inv. ex. |
| C-12 | 3.88 | 2.8 | 19 | 32.7 | 1.60 | 7.9 | 1.65 | 787 | 0 | Inv. ex. |
| C-13 | 2.95 | 2.7 | 20 | 40.3 | 1.70 | 8.7 | 1.72 | 679 | 0 | Inv. ex. |
| C-14 | 2.10 | 3.0 | 20 | 46.0 | 1.74 | 9.1 | 1.75 | 604 | 0 | Inv. ex. |
| C-15 | 3.98 | 2.8 | 21 | 32.8 | 1.61 | 7.8 | 1.64 | 775 | 0 | Inv. ex. |
| C-16 | 2.96 | 2.8 | 19 | 39.6 | 1.70 | 8.5 | 1.72 | 684 | 0 | Inv. ex. |
| C-17 | 2.21 | 2.9 | 21 | 45.9 | 1.74 | 9.0 | 1.75 | 615 | 0 | Inv. ex. |
| C-18 | 3.84 | 2.7 | 19 | 31.6 | 1.60 | 7.8 | 1.64 | 789 | 0 | Inv. ex. |
| C-19 | 2.99 | 2.8 | 19 | 39.6 | 1.69 | 8.6 | 1.71 | 685 | 0 | Inv. ex. |
| C-20 | 2.11 | 3.0 | 20 | 45.9 | 1.74 | 9.1 | 1.76 | 620 | 0 | Inv. ex. |
| C-21 | 3.95 | 2.8 | 21 | 31.1 | 1.60 | 7.8 | 1.65 | 790 | 0 | Inv. ex. |
| C-22 | 2.96 | 2.6 | 19 | 39.6 | 1.69 | 8.4 | 1.71 | 677 | 0 | Inv. ex. |
| C-23 | 2.14 | 3.0 | 18 | 45.1 | 1.73 | 9.1 | 1.76 | 604 | 0 | Inv. ex. |
| C-24 | 3.93 | 2.7 | 19 | 32.6 | 1.61 | 7.9 | 1.65 | 773 | 0 | Inv. ex. |
| C-25 | 2.99 | 2.8 | 21 | 39.8 | 1.70 | 8.6 | 1.72 | 677 | 0 | Inv. ex. |
| C-26 | 2.20 | 2.9 | 19 | 45.1 | 1.74 | 9.2 | 1.75 | 607 | 0 | Inv. ex. |
| C-27 | 3.87 | 2.9 | 19 | 32.0 | 1.61 | 7.8 | 1.65 | 784 | 0 | Inv. ex. |
| C-28 | 2.98 | 2.7 | 20 | 40.4 | 1.69 | 8.3 | 1.72 | 684 | 0 | Inv. ex. |
| C-29 | 2.10 | 2.7 | 21 | 45.7 | 1.73 | 9.1 | 1.75 | 602 | 0 | Inv. ex. |
| C-30 | 3.88 | 3.0 | 21 | 31.6 | 1.60 | 7.9 | 1.64 | 770 | 0 | Inv. ex. |
| C-31 | 2.97 | 2.7 | 19 | 40.4 | 1.69 | 8.5 | 1.71 | 678 | 0 | Inv. ex. |
| C-32 | 2.07 | 2.7 | 19 | 45.6 | 1.74 | 9.1 | 1.75 | 608 | 0 | Inv. ex. |
| C-33 | 3.91 | 2.8 | 21 | 31.3 | 1.61 | 7.9 | 1.65 | 789 | 0 | Inv. ex. |
| C-34 | 2.98 | 2.9 | 20 | 40.5 | 1.69 | 8.6 | 1.71 | 676 | 0 | Inv. ex. |
| C-35 | 2.10 | 2.6 | 21 | 45.1 | 1.74 | 9.2 | 1.75 | 601 | 0 | Inv. ex. |
| C-36 | 3.98 | 2.8 | 19 | 32.6 | 1.60 | 7.8 | 1.65 | 778 | 0 | Inv. ex. |
| C-37 | 3.00 | 2.9 | 21 | 40.2 | 1.70 | 8.3 | 1.72 | 680 | 2 | Inv. ex. |
| C-38 | 3.00 | 2.7 | 19 | 39.2 | 1.69 | 8.6 | 1.72 | 722 | 102 | Inv. ex. |
| C-39 | 2.21 | 3.1 | 20 | 45.9 | 1.73 | 9.2 | 1.75 | 658 | 102 | Inv. ex. |
| C-40 | 3.88 | 2.9 | 20 | 31.4 | 1.60 | 7.8 | 1.64 | 816 | 105 | Inv. ex. |
| C-41 | 2.97 | 0.4 | 102 | 10.7 | 1.65 | 10.5 | 1.62 | 467 | 0 | Comp. ex. |
| C-42 | 2.98 | 0.3 | 92 | 10.6 | 1.64 | 10.4 | 1.61 | 463 | 0 | Comp. ex. |
| C-43 | 2.96 | 0.4 | 92 | 10.5 | 1.65 | 10.4 | 1.61 | 455 | 0 | Comp. ex. |
| C-44 | 2.98 | 2.5 | 98 | 10.2 | 1.70 | 10.0 | 1.70 | 463 | 0 | Comp. ex. |
| C-45 | 2.97 | 3.0 | 99 | 10.1 | 1.70 | 10.1 | 1.69 | 460 | 0 | Comp. ex. |
| C-46 | 2.95 | 2.9 | 96 | 10.3 | 1.69 | 10.1 | 1.69 | 465 | 0 | Comp. ex. |
| C-47 | 2.98 | 0.7 | 24 | 38.8 | 1.63 | 10.0 | 1.61 | 680 | 0 | Comp. ex. |
| C-48 | 2.98 | 0.3 | 17 | 39.8 | 1.63 | 10.1 | 1.61 | 674 | 0 | Comp. ex. |
| C-49 | 2.98 | 0.4 | 18 | 39.0 | 1.62 | 9.9 | 1.62 | 663 | 0 | Comp. ex. |
| C-50 | 2.94 | 2.8 | 18 | 38.9 | 1.69 | 29.5 | 1.69 | 663 | 0 | Comp. ex. |
| C-51 | 2.43 | 0.3 | 20 | 39.2 | 1.63 | 12.9 | 1.61 | 676 | 0 | Comp. ex. |
| C-52 | 2.42 | 0.5 | 20 | 38.2 | 1.62 | 11.6 | 1.60 | 687 | 0 | Comp. ex. |
| C-53 | 2.46 | 0.5 | 19 | 37.6 | 1.61 | 11.2 | 1.59 | 699 | 0 | Comp. ex. |
| C-54 | 2.50 | 0.6 | 19 | 35.7 | 1.60 | 10.6 | 1.58 | 707 | 0 | Comp. ex. |
| C-55 | 3.00 | 0.6 | 21 | 33.3 | 1.58 | 10.3 | 1.56 | 726 | 0 | Comp. ex. |
| C-56 | 2.97 | 0.6 | 20 | 32.4 | 1.57 | 9.8 | 1.55 | 749 | 0 | Comp. ex. |
| C-57 | 2.12 | 2.6 | 28 | 43.3 | 1.74 | 9.2 | 1.76 | 605 | 0 | Comp. ex. |
| C-58 | 2.12 | 2.5 | 36 | 40.3 | 1.74 | 9.2 | 1.76 | 586 | 0 | Comp. ex. |

Example 4

1.3 mm thick strips having the chemical compositions shown in the following Table 7 were prepared. Further, separate from the above-mentioned strip casting, slabs cast to slab thicknesses of 250 mm were hot rolled under conditions of a slab reheating temperature of 1200° C., a finishing temperature of 850° C., and a coiling temperature of 650° C. to obtain steel sheets hot rolled to 2.0 mm. Next, these steel sheets were pickled to remove the surface layer scale. After that, they were cold rolled to 0.25 mm. The finish annealing operations were performed at 750° C. for 1 minute. D-38 to 40 were annealed at 600° C. for 1 minute after finish annealing as treatment for precipitation of Cu.

The obtained non-oriented electrical steel sheets were measured for {100} crystal texture, average grain size, tensile strength, number of Cu precipitates, core loss W10/400, and magnetic flux density B50 by methods similar to Example 1. The subsequent tensile test and stress relief annealing were performed in the same way as Example 1. The results are shown in Table 8.

The strip cast materials had {100} intensities after finish annealing larger than 2.4 (D-1 to 40, D-44 to 46, D-50, and D-57 to 58). The slab cast materials had {100} intensities after finish annealing lower than 2.4 (D-41 to 43 and D-47 to 49). D-51 to 56 were strip cast, but had Q of less than 2.0, so after finish annealing, the {100} intensities became lower than 2.4. The crystal grain sizes became about 20 μm or so in materials finished annealed at 750° C. (D-1 to 40 and D-47 to 57) and about 100 μm in materials finish annealed at 1050° C. (D-41 to 48).

D-1 to 30 were changed in various additive elements. Whatever the additive elements added, the effect of greatly lowering the core loss after stress relief annealing was obtained. D-31 to 40 had optional additive elements added to them. Even if adding optional additive elements, the effect of the core loss greatly falling at the time of stress relief annealing remained unchanged. D-37 to 40 had Cu added as an optional additive element. Among these, D-38 to 40 are invention examples treated to cause precipitation of metal particles. The average size and number of precipitates of metal Cu particles in D-38 to 40 were respectively about 30 nm and about 100/10 $\mu m^2$. Due to this precipitation treatment, if comparing D-38 to 40 and the Invention Examples D-1 to 3 of similar constituents, it is learned that between D-1 and D-38, D-2 and D-39, and D-3 and D-40, the ones treated to cause precipitation were higher in tensile strength. Therefore, by adding Cu as an optional additive element and performing treatment for precipitation of metal particles, the effect is obtained that it is possible to make the tensile strength particularly high.

D-1 and 41 to 49 are almost the same in constituents and are changed in manufacturing conditions. By increasing the {100} intensity or making the crystal grains before stress relief annealing smaller to make them coarser after stress relief annealing, there is the effect of lowering the core loss, but it is learned that when combining the two, it is possible to reduce the core loss after stress relief annealing more due to the synergistic effect. Note that, regarding the core loss after stress relief annealing, a core loss when Si is 2.0 to 2.3% of 9.5 W/kg or less, a core loss when Si is 2.4 to 3.1% of 9.0 W/kg or less, and a core loss when Si is 3.8 to 4.0% of 8.5 W/kg or less are deemed passing levels. Core losses higher than these are reached even without using the present invention, so are deemed failing.

D-50 shows the properties when Mg and other elements scavenging MnS are not included. Even with stress relief annealing, the crystal grain sizes do not satisfactory grow and as a result the core loss became worse.

D-41, 42, and 43 show comparative examples with {100} intensities of less than 2.4 and particle sizes of more than 30 μm. Further, D-44, 45, 46, and 58 show comparative examples with {100} intensities of 2.4 or more, but particle sizes of more than 30 μm. From these comparative examples, it is learned that if the particle size becomes more than 30 μm, sufficient tensile strength cannot be obtained.

D-51 to 56 show comparative examples with Q of less than 2.0. In these comparative examples, the steel sheets do not become single a-Fe phases, so the structures in the strips changed due to phase transformation after casting the strips and the {100} intensities after finishing annealing became lower than 2.4.

TABLE 7

| No. | Constituents (mass %) | | | | | | | | | | | | | | | | | | | Remarks |
|---|---|---|---|---|---|---|---|---|---|---|---|---|---|---|---|---|---|---|---|---|
| | C | Si | Mn | Al | P | S | Mg | Ca | Sr | Ba | Ce | La | Nd | Pr | Zn | Cd | Sn | Cr | Cu | Q | |
| D-1 | 0.0016 | 2.98 | 0.19 | 0.28 | 0.013 | 0.0013 | 0.0046 | — | — | — | — | — | — | — | — | — | — | — | — | 3.4 | Inv. ex. |
| D-2 | 0.0006 | 2.12 | 0.14 | 0.14 | 0.008 | 0.0007 | 0.0005 | — | — | — | — | — | — | — | — | — | — | — | — | 2.3 | Inv. ex. |
| D-3 | 0.0027 | 3.89 | 2.35 | 2.96 | 0.185 | 0.0027 | 0.0062 | — | — | — | — | — | — | — | — | — | — | — | — | 7.5 | Inv. ex. |
| D-4 | 0.0017 | 2.95 | 0.20 | 0.30 | 0.013 | 0.0014 | — | 0.0048 | — | — | — | — | — | — | — | — | — | — | — | 3.4 | Inv. ex. |
| D-5 | 0.0007 | 2.21 | 0.17 | 0.16 | 0.008 | 0.0007 | — | 0.0062 | — | — | — | — | — | — | — | — | — | — | — | 2.4 | Inv. ex. |
| D-6 | 0.0025 | 3.80 | 2.37 | 2.92 | 0.197 | 0.0026 | — | 0.0073 | — | — | — | — | — | — | — | — | — | — | — | 7.3 | Inv. ex. |
| D-7 | 0.0018 | 2.98 | 0.18 | 0.31 | 0.011 | 0.0013 | — | — | 0.0045 | — | — | — | — | — | — | — | — | — | — | 3.4 | Inv. ex. |
| D-8 | 0.0007 | 2.11 | 0.17 | 0.11 | 0.005 | 0.0009 | — | — | 0.0005 | — | — | — | — | — | — | — | — | — | — | 2.2 | Inv. ex. |
| D-9 | 0.0026 | 3.95 | 2.28 | 2.88 | 0.188 | 0.0026 | — | — | 0.0069 | — | — | — | — | — | — | — | — | — | — | 7.4 | Inv. ex. |
| D-10 | 0.0018 | 2.99 | 0.19 | 0.30 | 0.013 | 0.0014 | — | — | — | 0.0048 | — | — | — | — | — | — | — | — | — | 3.4 | Inv. ex. |
| D-11 | 0.0008 | 2.04 | 0.17 | 0.13 | 0.007 | 0.0009 | — | — | — | 0.0006 | — | — | — | — | — | — | — | — | — | 2.1 | Inv. ex. |
| D-12 | 0.0026 | 3.89 | 2.20 | 2.98 | 0.193 | 0.0026 | — | — | — | 0.0031 | — | — | — | — | — | — | — | — | — | 7.7 | Inv. ex. |
| D-13 | 0.0019 | 2.97 | 0.18 | 0.30 | 0.012 | 0.0013 | — | — | — | — | 0.0047 | — | — | — | — | — | — | — | — | 3.4 | Inv. ex. |
| D-14 | 0.0006 | 2.15 | 0.14 | 0.14 | 0.007 | 0.0006 | — | — | — | — | 0.0005 | — | — | — | — | — | — | — | — | 2.3 | Inv. ex. |
| D-15 | 0.0027 | 3.87 | 2.32 | 2.97 | 0.197 | 0.0028 | — | — | — | — | 0.0058 | — | — | — | — | — | — | — | — | 7.5 | Inv. ex. |
| D-16 | 0.0015 | 2.96 | 0.18 | 0.29 | 0.013 | 0.0013 | — | — | — | — | — | 0.0045 | — | — | — | — | — | — | — | 3.4 | Inv. ex. |
| D-17 | 0.0009 | 2.16 | 0.15 | 0.16 | 0.006 | 0.0006 | — | — | — | — | — | 0.0007 | — | — | — | — | — | — | — | 2.3 | Inv. ex. |
| D-18 | 0.0027 | 3.89 | 2.35 | 2.91 | 0.194 | 0.0027 | — | — | — | — | — | 0.0078 | — | — | — | — | — | — | — | 7.4 | Inv. ex. |
| D-19 | 0.0018 | 2.97 | 0.19 | 0.29 | 0.011 | 0.0014 | — | — | — | — | — | — | 0.0047 | — | — | — | — | — | — | 3.4 | Inv. ex. |
| D-20 | 0.0007 | 2.13 | 0.13 | 0.13 | 0.007 | 0.0008 | — | — | — | — | — | — | 0.0006 | — | — | — | — | — | — | 2.3 | Inv. ex. |
| D-21 | 0.0025 | 3.91 | 2.32 | 2.93 | 0.182 | 0.0027 | — | — | — | — | — | — | 0.0072 | — | — | — | — | — | — | 7.5 | Inv. ex. |
| D-22 | 0.0016 | 3.00 | 0.19 | 0.28 | 0.010 | 0.0012 | — | — | — | — | — | — | — | 0.0048 | — | — | — | — | — | 3.4 | Inv. ex. |
| D-23 | 0.0008 | 2.04 | 0.17 | 0.09 | 0.009 | 0.0007 | — | — | — | — | — | — | — | 0.0006 | — | — | — | — | — | 2.1 | Inv. ex. |
| D-24 | 0.0027 | 3.94 | 2.31 | 2.80 | 0.194 | 0.0026 | — | — | — | — | — | — | — | 0.0070 | — | — | — | — | — | 7.2 | Inv. ex. |
| D-25 | 0.0019 | 2.96 | 0.18 | 0.29 | 0.011 | 0.0013 | — | — | — | — | — | — | — | — | 0.0043 | — | — | — | — | 3.4 | Inv. ex. |
| D-26 | 0.0007 | 2.15 | 0.12 | 0.13 | 0.007 | 0.0008 | — | — | — | — | — | — | — | — | 0.0006 | — | — | — | — | 2.3 | Inv. ex. |
| D-27 | 0.0027 | 3.91 | 2.36 | 2.96 | 0.192 | 0.0026 | — | — | — | — | — | — | — | — | 0.0050 | — | — | — | — | 7.5 | Inv. ex. |
| D-28 | 0.0019 | 2.98 | 0.18 | 0.28 | 0.013 | 0.0014 | — | — | — | — | — | — | — | — | — | 0.0046 | — | — | — | 3.4 | Inv. ex. |
| D-29 | 0.0007 | 2.14 | 0.12 | 0.14 | 0.006 | 0.0007 | — | — | — | — | — | — | — | — | — | 0.0006 | — | — | — | 2.3 | Inv. ex. |
| D-30 | 0.0027 | 3.88 | 2.36 | 2.98 | 0.194 | 0.0028 | — | — | — | — | — | — | — | — | — | 0.0064 | — | — | — | 7.5 | Inv. ex. |
| D-31 | 0.0018 | 2.97 | 0.19 | 0.28 | 0.013 | 0.0014 | 0.0042 | — | — | — | — | — | — | — | — | — | 0.0700 | — | — | 3.3 | Inv. ex. |
| D-32 | 0.0007 | 2.13 | 0.14 | 0.05 | 0.010 | 0.0009 | 0.0006 | — | — | — | — | — | — | — | — | — | 0.0006 | — | — | 2.1 | Inv. ex. |
| D-33 | 0.0026 | 3.91 | 2.33 | 2.92 | 0.191 | 0.0025 | 0.0051 | — | — | — | — | — | — | — | — | — | 0.0063 | — | — | 7.4 | Inv. ex. |
| D-34 | 0.0018 | 2.99 | 0.19 | 0.29 | 0.012 | 0.0013 | 0.0041 | — | — | — | — | — | — | — | — | — | — | 0.0600 | — | 3.4 | Inv. ex. |
| D-35 | 0.0008 | 2.20 | 0.14 | 0.12 | 0.007 | 0.0008 | 0.0006 | — | — | — | — | — | — | — | — | — | — | 0.0007 | — | 2.3 | Inv. ex. |
| D-36 | 0.0026 | 3.97 | 2.31 | 2.89 | 0.188 | 0.0027 | 0.0063 | — | — | — | — | — | — | — | — | — | — | 0.0062 | — | 7.4 | Inv. ex. |
| D-37 | 0.0020 | 2.95 | 0.20 | 0.28 | 0.011 | 0.0012 | 0.0045 | — | — | — | — | — | — | — | — | — | — | — | 1.5 | 3.3 | Inv. ex. |
| D-38 | 0.0020 | 2.95 | 0.20 | 0.28 | 0.011 | 0.0012 | 0.0045 | — | — | — | — | — | — | — | — | — | — | — | 1.5 | 3.3 | Inv. ex. |
| D-39 | 0.0008 | 2.10 | 0.13 | 0.12 | 0.006 | 0.0007 | 0.0007 | — | — | — | — | — | — | — | — | — | — | — | 1.8 | 2.2 | Inv. ex. |
| D-40 | 0.0025 | 3.95 | 2.37 | 2.89 | 0.196 | 0.0028 | 0.0059 | — | — | — | — | — | — | — | — | — | — | — | 1.6 | 7.4 | Inv. ex. |
| D-41 | 0.0018 | 2.97 | 0.20 | 0.28 | 0.011 | 0.0011 | 0.0046 | — | — | — | — | — | — | — | — | — | — | — | — | 3.3 | Comp. ex. |
| D-42 | 0.0019 | 2.95 | 0.19 | 0.29 | 0.013 | 0.0010 | 0.0046 | — | — | — | — | — | — | — | — | — | — | — | — | 3.3 | Comp. ex. |
| D-43 | 0.0020 | 2.94 | 0.20 | 0.30 | 0.014 | 0.0014 | 0.0050 | — | — | — | — | — | — | — | — | — | — | — | — | 3.3 | Comp. ex. |
| D-44 | 0.0019 | 2.96 | 0.20 | 0.30 | 0.012 | 0.0013 | 0.0043 | — | — | — | — | — | — | — | — | — | — | — | — | 3.4 | Comp. ex. |
| D-45 | 0.0018 | 2.98 | 0.20 | 0.32 | 0.014 | 0.0015 | 0.0047 | — | — | — | — | — | — | — | — | — | — | — | — | 3.4 | Comp. ex. |
| D-46 | 0.0019 | 2.97 | 0.19 | 0.29 | 0.013 | 0.0011 | 0.0043 | — | — | — | — | — | — | — | — | — | — | — | — | 3.4 | Comp. ex. |
| D-47 | 0.0020 | 2.99 | 0.20 | 0.29 | 0.012 | 0.0012 | 0.0049 | — | — | — | — | — | — | — | — | — | — | — | — | 3.4 | Comp. ex. |

TABLE 7-continued

| | | | | | | | | | | | | | | | | | | | | | |
|---|---|---|---|---|---|---|---|---|---|---|---|---|---|---|---|---|---|---|---|---|---|
| D-48 | 0.0020 | 2.99 | 0.19 | 0.28 | 0.015 | 0.0014 | 0.0045 | — | — | — | — | — | — | — | — | — | — | — | — | 3.4 | Comp. ex. |
| D-49 | 0.0016 | 2.97 | 0.20 | 0.31 | 0.014 | 0.0011 | 0.0043 | — | — | — | — | — | — | — | — | — | — | — | — | 3.4 | Comp. ex. |
| D-50 | 0.0018 | 2.96 | 0.19 | 0.29 | 0.014 | 0.0012 | — | — | — | — | — | — | — | — | — | — | — | — | — | 3.3 | Comp. ex. |
| D-51 | 0.0015 | 2.44 | 1.47 | 0.28 | 0.012 | 0.0011 | 0.0045 | — | — | — | — | — | — | — | — | — | — | — | — | 1.5 | Comp. ex. |
| D-52 | 0.0019 | 2.42 | 1.80 | 0.29 | 0.012 | 0.0013 | 0.0043 | — | — | — | — | — | — | — | — | — | — | — | — | 1.2 | Comp. ex. |
| D-53 | 0.0016 | 2.40 | 1.99 | 0.28 | 0.012 | 0.0011 | 0.0042 | — | — | — | — | — | — | — | — | — | — | — | — | 1.0 | Comp. ex. |
| D-54 | 0.0018 | 2.45 | 2.22 | 0.28 | 0.014 | 0.0014 | 0.0044 | — | — | — | — | — | — | — | — | — | — | — | — | 0.8 | Comp. ex. |
| D-55 | 0.0019 | 3.00 | 2.21 | 0.28 | 0.015 | 0.0012 | 0.0049 | — | — | — | — | — | — | — | — | — | — | — | — | 1.4 | Comp. ex. |
| D-56 | 0.0019 | 2.90 | 2.25 | 0.59 | 0.012 | 0.0014 | 0.0042 | — | — | — | — | — | — | — | — | — | — | — | — | 1.8 | Comp. ex. |
| D-57 | 0.0006 | 2.13 | 0.12 | 0.11 | 0.007 | 0.0008 | 0.0006 | — | — | — | — | — | — | — | — | — | — | — | — | 2.2 | Inv. ex. |
| D-58 | 0.0006 | 2.11 | 0.12 | 0.11 | 0.008 | 0.0009 | 0.0008 | — | — | — | — | — | — | — | — | — | — | — | — | 2.2 | Comp. ex. |

TABLE 8

| No. | Si | {100} intensity of texture before stress relief annealing | Grain size before stress relief annealing (µm) | Magnetic properties before stress relief annealing W10/400 (W/kg) | B50 (T) | Magnetic properties after stress relief annealing W10/400 (W/kg) | B50 (T) | Tensile strength before stress relief annealing (MPa) | No. of 100 nm or less Cu particles before stress relief annealing (/10 µm2) | Remarks |
|---|---|---|---|---|---|---|---|---|---|---|
| D-1 | 2.98 | 2.6 | 18 | 40.2 | 1.69 | 8.4 | 1.71 | 678 | 0 | Inv. ex. |
| D-2 | 2.12 | 2.9 | 19 | 44.8 | 1.73 | 9.2 | 1.76 | 607 | 0 | Inv. ex. |
| D-3 | 3.89 | 2.9 | 21 | 32.1 | 1.61 | 7.9 | 1.65 | 788 | 0 | Inv. ex. |
| D-4 | 2.95 | 2.7 | 21 | 40.4 | 1.69 | 8.4 | 1.71 | 677 | 0 | Inv. ex. |
| D-5 | 2.21 | 3.0 | 19 | 45.7 | 1.73 | 9.1 | 1.75 | 615 | 0 | Inv. ex. |
| D-6 | 3.80 | 2.8 | 18 | 32.2 | 1.60 | 7.9 | 1.64 | 788 | 0 | Inv. ex. |
| D-7 | 2.98 | 2.6 | 21 | 39.9 | 1.70 | 8.7 | 1.72 | 684 | 0 | Inv. ex. |
| D-8 | 2.11 | 2.7 | 20 | 45.9 | 1.74 | 9.1 | 1.76 | 616 | 0 | Inv. ex. |
| D-9 | 3.95 | 3.0 | 20 | 32.2 | 1.60 | 7.8 | 1.65 | 774 | 0 | Inv. ex. |
| D-10 | 2.99 | 2.7 | 19 | 39.8 | 1.70 | 8.5 | 1.72 | 676 | 0 | Inv. ex. |
| D-11 | 2.04 | 3.1 | 22 | 45.0 | 1.74 | 9.1 | 1.76 | 602 | 0 | Inv. ex. |
| D-12 | 3.89 | 2.8 | 22 | 32.1 | 1.61 | 7.8 | 1.64 | 775 | 0 | Inv. ex. |
| D-13 | 2.97 | 2.9 | 22 | 40.0 | 1.69 | 8.4 | 1.71 | 678 | 0 | Inv. ex. |
| D-14 | 2.15 | 2.9 | 18 | 45.1 | 1.73 | 9.0 | 1.75 | 601 | 0 | Inv. ex. |
| D-15 | 3.87 | 2.9 | 19 | 31.8 | 1.60 | 7.9 | 1.65 | 778 | 0 | Inv. ex. |
| D-16 | 2.96 | 2.6 | 21 | 39.6 | 1.70 | 8.5 | 1.72 | 684 | 0 | Inv. ex. |
| D-17 | 2.16 | 2.9 | 21 | 45.3 | 1.74 | 9.2 | 1.75 | 603 | 0 | Inv. ex. |
| D-18 | 3.89 | 2.9 | 21 | 32.8 | 1.61 | 7.9 | 1.65 | 771 | 0 | Inv. ex. |
| D-19 | 2.97 | 2.5 | 19 | 39.7 | 1.70 | 8.4 | 1.72 | 682 | 0 | Inv. ex. |
| D-20 | 2.13 | 3.0 | 22 | 44.0 | 1.74 | 9.2 | 1.75 | 618 | 0 | Inv. ex. |
| D-21 | 3.91 | 2.8 | 22 | 31.0 | 1.60 | 7.8 | 1.64 | 776 | 0 | Inv. ex. |
| D-22 | 3.00 | 2.9 | 21 | 39.7 | 1.69 | 8.3 | 1.71 | 679 | 0 | Inv. ex. |
| D-23 | 2.04 | 3.0 | 18 | 45.1 | 1.74 | 9.0 | 1.76 | 608 | 0 | Inv. ex. |
| D-24 | 3.94 | 3.0 | 19 | 32.7 | 1.61 | 7.8 | 1.64 | 774 | 0 | Inv. ex. |
| D-25 | 2.96 | 2.6 | 20 | 39.5 | 1.69 | 8.6 | 1.71 | 683 | 0 | Inv. ex. |
| D-26 | 2.15 | 3.0 | 19 | 45.3 | 1.73 | 9.0 | 1.75 | 606 | 0 | Inv. ex. |
| D-27 | 3.91 | 2.9 | 20 | 32.8 | 1.61 | 7.9 | 1.64 | 778 | 0 | Inv. ex. |
| D-28 | 2.98 | 2.7 | 20 | 39.6 | 1.70 | 8.5 | 1.72 | 679 | 0 | Inv. ex. |
| D-29 | 2.14 | 3.0 | 22 | 45.5 | 1.73 | 9.1 | 1.75 | 611 | 0 | Inv. ex. |
| D-30 | 3.88 | 2.7 | 19 | 31.3 | 1.60 | 7.9 | 1.64 | 788 | 0 | Inv. ex. |
| D-31 | 2.97 | 3.0 | 21 | 40.2 | 1.69 | 8.4 | 1.71 | 683 | 0 | Inv. ex. |
| D-32 | 2.13 | 2.9 | 20 | 45.6 | 1.74 | 9.0 | 1.75 | 600 | 0 | Inv. ex. |
| D-33 | 3.91 | 3.0 | 20 | 31.9 | 1.60 | 7.8 | 1.65 | 786 | 0 | Inv. ex. |
| D-34 | 2.99 | 2.7 | 19 | 40.0 | 1.70 | 8.3 | 1.72 | 680 | 0 | Inv. ex. |
| D-35 | 2.20 | 2.9 | 20 | 45.5 | 1.73 | 9.1 | 1.75 | 603 | 0 | Inv. ex. |
| D-36 | 3.97 | 2.8 | 18 | 32.0 | 1.61 | 7.8 | 1.65 | 789 | 0 | Inv. ex. |
| D-37 | 2.95 | 3.0 | 18 | 40.3 | 1.69 | 8.7 | 1.71 | 684 | 1 | Inv. ex. |
| D-38 | 2.95 | 2.7 | 22 | 39.0 | 1.70 | 8.4 | 1.71 | 728 | 105 | Inv. ex. |
| D-39 | 2.10 | 2.8 | 18 | 45.5 | 1.74 | 9.0 | 1.75 | 655 | 105 | Inv. ex. |
| D-40 | 3.95 | 2.8 | 19 | 31.6 | 1.61 | 7.9 | 1.64 | 816 | 106 | Inv. ex. |
| D-41 | 2.97 | 0.3 | 101 | 10.6 | 1.65 | 10.5 | 1.62 | 467 | 0 | Comp. ex. |
| D-42 | 2.95 | 0.5 | 99 | 10.7 | 1.65 | 10.5 | 1.62 | 463 | 0 | Comp. ex. |
| D-43 | 2.94 | 0.6 | 104 | 10.5 | 1.65 | 10.5 | 1.61 | 457 | 0 | Comp. ex. |
| D-44 | 2.96 | 2.6 | 99 | 10.0 | 1.70 | 9.9 | 1.70 | 461 | 0 | Comp. ex. |
| D-45 | 2.98 | 3.1 | 97 | 10.1 | 1.70 | 10.1 | 1.70 | 458 | 0 | Comp. ex. |
| D-46 | 2.97 | 2.9 | 104 | 10.3 | 1.69 | 10.0 | 1.69 | 457 | 0 | Comp. ex. |
| D-47 | 2.99 | 0.3 | 25 | 38.8 | 1.62 | 10.0 | 1.62 | 661 | 0 | Comp. ex. |
| D-48 | 2.99 | 0.4 | 19 | 38.1 | 1.62 | 10.0 | 1.61 | 665 | 0 | Comp. ex. |
| D-49 | 2.97 | 0.6 | 19 | 39.0 | 1.62 | 10.0 | 1.61 | 661 | 0 | Comp. ex. |
| D-50 | 2.96 | 3.1 | 19 | 39.4 | 1.69 | 29.7 | 1.69 | 676 | 0 | Comp. ex. |
| D-51 | 2.44 | 0.5 | 20 | 39.9 | 1.63 | 12.8 | 1.61 | 680 | 0 | Comp. ex. |
| D-52 | 2.42 | 0.5 | 19 | 38.4 | 1.62 | 11.5 | 1.60 | 690 | 0 | Comp. ex. |
| D-53 | 2.40 | 0.3 | 20 | 37.1 | 1.61 | 11.5 | 1.59 | 695 | 0 | Comp. ex. |
| D-54 | 2.45 | 0.4 | 19 | 35.0 | 1.60 | 10.7 | 1.58 | 707 | 0 | Comp. ex. |
| D-55 | 3.00 | 0.3 | 20 | 33.8 | 1.58 | 9.8 | 1.56 | 729 | 0 | Comp. ex. |
| D-56 | 2.90 | 0.3 | 19 | 32.8 | 1.57 | 10.0 | 1.55 | 747 | 0 | Comp. ex. |
| D-57 | 2.13 | 2.7 | 29 | 43.1 | 1.74 | 9.1 | 1.76 | 602 | 0 | Inv. ex. |
| D-58 | 2.11 | 2.6 | 33 | 40.3 | 1.74 | 9.2 | 1.77 | 579 | 0 | Comp. ex. |

The invention claimed is:

1. A non-oriented electrical steel sheet having a chemical composition containing C: 0.0030 mass % or less, Si: 2.0 mass % or more and 4.0 mass % or less, Al: 0.010 mass % or more and 3.0% mass or less, Mn: 0.10 mass % or more and 2.4 mass % or less, P: 0.0050 mass % or more and 0.20 mass % or less, S: 0.0030 mass % or less, and one or more elements selected from the group comprising Mg, Ca, Sr, Ba, Ce, La, Nd, Pr, Zn, and Cd: total 0.00050 mass % or more and having a balance of Fe and unavoidable impurities, where, when designating a mass % of Si as [Si], a mass % of Al as [Al], and a mass % of Mn as [Mn], a parameter Q shown by the following formula (1) is 2.0 or more, a random intensity ratio of the {100} orientation is 2.4 or more, and an average grain size is 30 μm or less:

$$Q=[Si]+2[Al]-[Mn] \quad (1).$$

2. The non-oriented electrical steel sheet according to claim 1, further containing at least one composition selected from the group comprised of Sn: 0.02 mass % or more and 0.40 mass % or less, Cr: 0.02 mass % or more and 2.00 mass % or less, and Cu: 0.10 mass % or more and 2.00 mass % or less.

3. The non-oriented electrical steel sheet according to claim 1 further containing metal Cu particles having a diameter of 100 nm or less in a number density of particles or more per 10 $\mu m^2$.

4. The non-oriented electrical steel sheet according to claim 1 wherein the tensile strength is 600 MPa or more.

5. The non-oriented electrical steel sheet according to claim 2 further containing metal Cu particles having a diameter of 100 nm or less in a number density of particles or more per 10 $\mu m^2$.

6. The non-oriented electrical steel sheet according to claim 2 wherein the tensile strength is 600 MPa or more.

7. The non-oriented electrical steel sheet according to claim 3 wherein the tensile strength is 600 MPa or more.

* * * * *